US009438888B2

(12) United States Patent
Venkataraman et al.

(10) Patent No.: US 9,438,888 B2
(45) Date of Patent: Sep. 6, 2016

(54) SYSTEMS AND METHODS FOR STEREO IMAGING WITH CAMERA ARRAYS

(71) Applicant: Pelican Imaging Corporation, Santa Clara, CA (US)

(72) Inventors: Kartik Venkataraman, San Jose, CA (US); Paul Gallagher, San Jose, CA (US); Ankit Jain, San Diego, CA (US); Semyon Nisenzon, Palo Alto, CA (US)

(73) Assignee: Pelican Imaging Corporation, Santa Clara, CA (US)

( * ) Notice: Subject to any disclaimer, the term of this patent is extended or adjusted under 35 U.S.C. 154(b) by 202 days.

(21) Appl. No.: 14/216,968

(22) Filed: Mar. 17, 2014

(65) Prior Publication Data
US 2014/0267633 A1 Sep. 18, 2014

Related U.S. Application Data

(60) Provisional application No. 61/798,673, filed on Mar. 15, 2013.

(51) Int. Cl.
*H04N 13/02* (2006.01)
*G06T 7/00* (2006.01)
(Continued)

(52) U.S. Cl.
CPC ............. *H04N 13/0242* (2013.01); *G01P 3/38* (2013.01); *G06T 7/0075* (2013.01); *G06T 7/2093* (2013.01); *G06T 2207/10012* (2013.01); *G06T 2207/10021* (2013.01)

(58) Field of Classification Search
CPC ............. G06T 7/0075; G06T 7/2093; H04N 13/0242
See application file for complete search history.

(56) References Cited

U.S. PATENT DOCUMENTS

| 4,124,798 A | 11/1978 | Thompson |
| 4,198,646 A | 4/1980 | Alexander et al. |

(Continued)

FOREIGN PATENT DOCUMENTS

| EP | 840502 A2 | 5/1998 |
| EP | 1201407 A2 | 5/2002 |

(Continued)

OTHER PUBLICATIONS

International Preliminary Report on Patentability for International Application PCT/US2013/039155, report completed Nov. 4, 2014, Mailed Nov. 13, 2014, 10 Pgs.

(Continued)

*Primary Examiner* — Sath V Perungavoor
*Assistant Examiner* — Peter D Le
(74) *Attorney, Agent, or Firm* — KPPB LLP

(57) ABSTRACT

Systems and methods for stereo imaging with camera arrays in accordance with embodiments of the invention are disclosed. In one embodiment, a method of generating depth information for an object using two or more array cameras that each include a plurality of imagers includes obtaining a first set of image data captured from a first set of viewpoints, identifying an object in the first set of image data, determining a first depth measurement, determining whether the first depth measurement is above a threshold, and when the depth is above the threshold: obtaining a second set of image data of the same scene from a second set of viewpoints located known distances from one viewpoint in the first set of viewpoints, identifying the object in the second set of image data, and determining a second depth measurement using the first set of image data and the second set of image data.

18 Claims, 7 Drawing Sheets

(51) Int. Cl.
*G06T 7/20* (2006.01)
*G01P 3/38* (2006.01)

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 5,005,083 A | 4/1991 | Grage |
| 5,070,414 A | 12/1991 | Tsutsumi |
| 5,144,448 A | 9/1992 | Hornbaker |
| 5,327,125 A | 7/1994 | Iwase et al. |
| 5,629,524 A | 5/1997 | Stettner et al. |
| 5,793,900 A | 8/1998 | Nourbakhsh et al. |
| 5,808,350 A | 9/1998 | Jack et al. |
| 5,832,312 A | 11/1998 | Rieger et al. |
| 5,880,691 A | 3/1999 | Fossum et al. |
| 5,933,190 A | 8/1999 | Dierickx et al. |
| 5,973,844 A | 10/1999 | Burger |
| 6,002,743 A | 12/1999 | Telymonde |
| 6,005,607 A | 12/1999 | Uomori et al. |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,137,535 A | 10/2000 | Meyers |
| 6,141,048 A | 10/2000 | Meyers |
| 6,160,909 A | 12/2000 | Melen |
| 6,163,414 A | 12/2000 | Kikuchi et al. |
| 6,175,379 B1 | 1/2001 | Uomori et al. |
| 6,205,241 B1 | 3/2001 | Melen |
| 6,239,909 B1 | 5/2001 | Hayashi et al. |
| 6,292,713 B1 | 9/2001 | Jouppi et al. |
| 6,358,862 B1 | 3/2002 | Ireland et al. |
| 6,477,260 B1 | 11/2002 | Shimomura |
| 6,525,302 B2 | 2/2003 | Dowski, Jr. et al. |
| 6,563,537 B1 | 5/2003 | Kawamura et al. |
| 6,603,513 B1 | 8/2003 | Berezin |
| 6,611,289 B1 | 8/2003 | Yu |
| 6,627,896 B1 | 9/2003 | Hashimoto et al. |
| 6,628,330 B1 | 9/2003 | Lin |
| 6,635,941 B2 | 10/2003 | Suda |
| 6,657,218 B2 | 12/2003 | Noda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,795,253 B2 | 9/2004 | Shinohara |
| 6,801,653 B1 | 10/2004 | Wu et al. |
| 6,819,358 B1 | 11/2004 | Kagle et al. |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,958,862 B1 | 10/2005 | Joseph |
| 7,085,409 B2 | 8/2006 | Sawhney et al. |
| 7,161,614 B1 | 1/2007 | Yamashita et al. |
| 7,199,348 B2 | 4/2007 | Olsen et al. |
| 7,262,799 B2 | 8/2007 | Suda |
| 7,292,735 B2 | 11/2007 | Blake et al. |
| 7,295,697 B1 | 11/2007 | Satoh |
| 7,333,651 B1 | 2/2008 | Kim et al. |
| 7,369,165 B2 | 5/2008 | Bosco et al. |
| 7,391,572 B2 | 6/2008 | Jacobowitz et al. |
| 7,408,725 B2 | 8/2008 | Sato |
| 7,606,484 B1 | 10/2009 | Richards et al. |
| 7,633,511 B2 | 12/2009 | Shum et al. |
| 7,646,549 B2 | 1/2010 | Zalevsky et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 | 4/2010 | Schmitt et al. |
| 7,723,662 B2 | 5/2010 | Levoy et al. |
| 7,782,364 B2 | 8/2010 | Smith |
| 7,840,067 B2 | 11/2010 | Shen et al. |
| 7,912,673 B2 | 3/2011 | Hébert et al. |
| 7,973,834 B2 | 7/2011 | Yang |
| 7,986,018 B2 | 7/2011 | Rennie |
| 7,990,447 B2 | 8/2011 | Honda et al. |
| 8,000,498 B2 | 8/2011 | Shih et al. |
| 8,013,904 B2 | 9/2011 | Tan et al. |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,304 B2 | 1/2012 | Pinto et al. |
| 8,106,949 B2 | 1/2012 | Tan et al. |
| 8,126,279 B2 | 2/2012 | Marcellin et al. |
| 8,130,120 B2 | 3/2012 | Kawabata et al. |
| 8,131,097 B2 | 3/2012 | Lelescu et al. |
| 8,164,629 B1 | 4/2012 | Zhang |
| 8,180,145 B2 | 5/2012 | Wu et al. |
| 8,189,089 B1 | 5/2012 | Georgiev et al. |
| 8,212,914 B2 | 7/2012 | Chiu |
| 8,213,711 B2 | 7/2012 | Tam |
| 8,231,814 B2 | 7/2012 | Duparre |
| 8,242,426 B2 | 8/2012 | Ward et al. |
| 8,244,027 B2 | 8/2012 | Takahashi |
| 8,254,668 B2 | 8/2012 | Mashitani et al. |
| 8,279,325 B2 | 10/2012 | Pitts et al. |
| 8,280,194 B2 | 10/2012 | Wong et al. |
| 8,289,409 B2 | 10/2012 | Chang |
| 8,294,099 B2 | 10/2012 | Blackwell, Jr. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,406,562 B2 | 3/2013 | Bassi et al. |
| 8,446,492 B2 | 5/2013 | Nakano et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,553,093 B2 | 10/2013 | Wong et al. |
| 8,559,756 B2 | 10/2013 | Georgiev et al. |
| 8,619,082 B1 | 12/2013 | Ciurea et al. |
| 8,655,052 B2 | 2/2014 | Spooner et al. |
| 8,682,107 B2 | 3/2014 | Yoon et al. |
| 8,692,893 B2 | 4/2014 | McMahon |
| 8,773,536 B1 | 7/2014 | Zhang |
| 8,780,113 B1 | 7/2014 | Ciurea et al. |
| 8,804,255 B2 | 8/2014 | Duparre |
| 8,830,375 B2 | 9/2014 | Ludwig |
| 8,831,367 B2 | 9/2014 | Venkataraman et al. |
| 8,854,462 B2 | 10/2014 | Herbin et al. |
| 8,861,089 B2 | 10/2014 | Duparre |
| 8,866,920 B2 | 10/2014 | Venkataraman et al. |
| 8,878,950 B2 | 11/2014 | Lelescu et al. |
| 8,885,059 B1 | 11/2014 | Venkataraman et al. |
| 8,885,922 B2 * | 11/2014 | Ito .............. H04N 13/0011 348/42 |
| 8,896,594 B2 | 11/2014 | Xiong et al. |
| 8,896,719 B1 | 11/2014 | Venkataraman et al. |
| 8,902,321 B2 | 12/2014 | Venkataraman et al. |
| 2001/0005225 A1 | 6/2001 | Clark et al. |
| 2001/0019621 A1 | 9/2001 | Hanna et al. |
| 2001/0038387 A1 | 11/2001 | Tomooka et al. |
| 2002/0012056 A1 | 1/2002 | Trevino |
| 2002/0027608 A1 | 3/2002 | Johnson |
| 2002/0039438 A1 | 4/2002 | Mori et al. |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee |
| 2002/0113867 A1 | 8/2002 | Takigawa et al. |
| 2002/0113888 A1 | 8/2002 | Sonoda et al. |
| 2002/0122113 A1 | 9/2002 | Foote et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2002/0190991 A1 | 12/2002 | Efran et al. |
| 2003/0025227 A1 | 2/2003 | Daniell |
| 2003/0086079 A1 | 5/2003 | Barth et al. |
| 2003/0124763 A1 | 7/2003 | Fan et al. |

(56) References Cited

U.S. PATENT DOCUMENTS

| | | |
|---|---|---|
| 2003/0140347 A1 | 7/2003 | Varsa |
| 2003/0179418 A1 | 9/2003 | Wengender et al. |
| 2003/0190072 A1 | 10/2003 | Adkins et al. |
| 2003/0198377 A1* | 10/2003 | Ng .................. G06K 9/20 382/154 |
| 2003/0211405 A1 | 11/2003 | Venkataraman |
| 2004/0008271 A1 | 1/2004 | Hagimori et al. |
| 2004/0012689 A1 | 1/2004 | Tinnerino et al. |
| 2004/0027358 A1 | 2/2004 | Nakao |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0061787 A1 | 4/2004 | Liu et al. |
| 2004/0066454 A1 | 4/2004 | Otani et al. |
| 2004/0075654 A1 | 4/2004 | Hsiao et al. |
| 2004/0100570 A1 | 5/2004 | Shizukuishi |
| 2004/0114807 A1 | 6/2004 | Lelescu et al. |
| 2004/0151401 A1 | 8/2004 | Sawhney et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0207836 A1 | 10/2004 | Chhibber et al. |
| 2004/0213449 A1 | 10/2004 | Safaee-Rad et al. |
| 2004/0218809 A1 | 11/2004 | Blake et al. |
| 2004/0234873 A1 | 11/2004 | Venkataraman |
| 2004/0240052 A1 | 12/2004 | Minefuji et al. |
| 2004/0251509 A1 | 12/2004 | Choi |
| 2004/0264806 A1 | 12/2004 | Herley |
| 2005/0006477 A1 | 1/2005 | Patel |
| 2005/0012035 A1 | 1/2005 | Miller |
| 2005/0036778 A1 | 2/2005 | DeMonte |
| 2005/0047678 A1 | 3/2005 | Jones et al. |
| 2005/0048690 A1 | 3/2005 | Yamamoto |
| 2005/0068436 A1 | 3/2005 | Fraenkel et al. |
| 2005/0128509 A1 | 6/2005 | Tokkonen et al. |
| 2005/0128595 A1 | 6/2005 | Shimizu |
| 2005/0132098 A1 | 6/2005 | Sonoda et al. |
| 2005/0134712 A1 | 6/2005 | Gruhlke et al. |
| 2005/0147277 A1 | 7/2005 | Higaki et al. |
| 2005/0151759 A1 | 7/2005 | Gonzalez-Banos et al. |
| 2005/0175257 A1 | 8/2005 | Kuroki |
| 2005/0185711 A1 | 8/2005 | Pfister et al. |
| 2005/0205785 A1 | 9/2005 | Hornback et al. |
| 2005/0219363 A1 | 10/2005 | Kohler |
| 2005/0225654 A1 | 10/2005 | Feldman et al. |
| 2005/0275946 A1 | 12/2005 | Choo et al. |
| 2005/0286612 A1 | 12/2005 | Takanashi |
| 2005/0286756 A1 | 12/2005 | Hong et al. |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0028476 A1 | 2/2006 | Sobel et al. |
| 2006/0029270 A1 | 2/2006 | Berestov et al. |
| 2006/0033005 A1 | 2/2006 | Jerdev et al. |
| 2006/0034003 A1 | 2/2006 | Zalevsky |
| 2006/0038891 A1 | 2/2006 | Okutomi et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0055811 A1 | 3/2006 | Frtiz et al. |
| 2006/0069478 A1 | 3/2006 | Iwama |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0152803 A1 | 7/2006 | Provitola |
| 2006/0157640 A1 | 7/2006 | Perlman et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |
| 2006/0203113 A1 | 9/2006 | Wada et al. |
| 2006/0210186 A1 | 9/2006 | Berkner |
| 2006/0239549 A1 | 10/2006 | Kelly et al. |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam |
| 2007/0030356 A1 | 2/2007 | Yea et al. |
| 2007/0036427 A1 | 2/2007 | Nakamura et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0092245 A1 | 4/2007 | Bazakos et al. |
| 2007/0102622 A1 | 5/2007 | Olsen et al. |
| 2007/0126898 A1 | 6/2007 | Feldman |
| 2007/0127831 A1 | 6/2007 | Venkataraman |
| 2007/0139333 A1 | 6/2007 | Sato et al. |
| 2007/0146503 A1 | 6/2007 | Shiraki |
| 2007/0146511 A1 | 6/2007 | Kinoshita et al. |
| 2007/0158427 A1 | 7/2007 | Zhu et al. |
| 2007/0159541 A1 | 7/2007 | Sparks et al. |
| 2007/0160310 A1 | 7/2007 | Tanida et al. |
| 2007/0165931 A1 | 7/2007 | Higaki |
| 2007/0171290 A1 | 7/2007 | Kroger |
| 2007/0206241 A1 | 9/2007 | Smith et al. |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0236595 A1 | 10/2007 | Pan et al. |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0263113 A1 | 11/2007 | Baek et al. |
| 2007/0263114 A1 | 11/2007 | Gurevich et al. |
| 2007/0268374 A1 | 11/2007 | Robinson |
| 2007/0296835 A1 | 12/2007 | Olsen et al. |
| 2008/0019611 A1 | 1/2008 | Larkin |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0054518 A1 | 3/2008 | Ra et al. |
| 2008/0062164 A1 | 3/2008 | Bassi et al. |
| 2008/0079805 A1 | 4/2008 | Takagi et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0112635 A1 | 5/2008 | Kondo et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0158259 A1 | 7/2008 | Kempf et al. |
| 2008/0158375 A1 | 7/2008 | Kakkori et al. |
| 2008/0158698 A1 | 7/2008 | Chang et al. |
| 2008/0174670 A1 | 7/2008 | Olsen et al. |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0239116 A1 | 10/2008 | Smith |
| 2008/0240598 A1 | 10/2008 | Hasegawa |
| 2008/0247638 A1 | 10/2008 | Tanida et al. |
| 2008/0247653 A1 | 10/2008 | Moussavi et al. |
| 2008/0272416 A1 | 11/2008 | Yun |
| 2008/0273751 A1 | 11/2008 | Yuan et al. |
| 2008/0278591 A1 | 11/2008 | Barna et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |

(56) References Cited

U.S. PATENT DOCUMENTS

| | | |
|---|---|---|
| 2009/0096050 A1 | 4/2009 | Park |
| 2009/0102956 A1 | 4/2009 | Georgiev |
| 2009/0109306 A1 | 4/2009 | Shan et al. |
| 2009/0128833 A1 | 5/2009 | Yahav |
| 2009/0129667 A1 | 5/2009 | Ho et al. |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0237520 A1 | 9/2009 | Kaneko et al. |
| 2009/0263017 A1 | 10/2009 | Tanbakuchi |
| 2009/0268192 A1 | 10/2009 | Koenck et al. |
| 2009/0268970 A1 | 10/2009 | Babacan et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0013927 A1 | 1/2010 | Nixon |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0073463 A1 | 3/2010 | Momonoi et al. |
| 2010/0085425 A1 | 4/2010 | Tan |
| 2010/0086227 A1 | 4/2010 | Sun et al. |
| 2010/0091389 A1 | 4/2010 | Henriksen et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0133230 A1 | 6/2010 | Henriksen et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0165152 A1 | 7/2010 | Lim |
| 2010/0171866 A1 | 7/2010 | Brady et al. |
| 2010/0177411 A1 | 7/2010 | Hegde et al. |
| 2010/0182406 A1 | 7/2010 | Benitez et al. |
| 2010/0194901 A1 | 8/2010 | van Hoorebeke et al. |
| 2010/0195716 A1 | 8/2010 | Klein et al. |
| 2010/0201834 A1 | 8/2010 | Maruyama et al. |
| 2010/0208100 A9 | 8/2010 | Olsen, R I. et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0259610 A1* | 10/2010 | Petersen ............... G06Q 30/02 348/142 |
| 2010/0265346 A1 | 10/2010 | Iizuka |
| 2010/0265385 A1 | 10/2010 | Knight et al. |
| 2010/0281070 A1 | 11/2010 | Chan et al. |
| 2010/0302423 A1 | 12/2010 | Adams, Jr. et al. |
| 2010/0309292 A1 | 12/2010 | Ho et al. |
| 2011/0001037 A1 | 1/2011 | Tewinkle |
| 2011/0018973 A1 | 1/2011 | Takayama |
| 2011/0032370 A1 | 2/2011 | Ludwig |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0044502 A1 | 2/2011 | Liu et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0115886 A1 | 5/2011 | Nguyen et al. |
| 2011/0121421 A1 | 5/2011 | Charbon et al. |
| 2011/0122308 A1 | 5/2011 | Duparre |
| 2011/0128412 A1 | 6/2011 | Milnes et al. |
| 2011/0149408 A1 | 6/2011 | Hahgholt et al. |
| 2011/0149409 A1 | 6/2011 | Haugholt et al. |
| 2011/0153248 A1 | 6/2011 | Gu et al. |
| 2011/0157321 A1 | 6/2011 | Nakajima et al. |
| 2011/0176020 A1 | 7/2011 | Chang |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0221939 A1 | 9/2011 | Jerdev |
| 2011/0234841 A1 | 9/2011 | Akeley et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0255592 A1 | 10/2011 | Sung et al. |
| 2011/0255745 A1 | 10/2011 | Hodder et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1 | 11/2011 | Mcmahon |
| 2011/0285866 A1 | 11/2011 | Bhrugumalla et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0317766 A1 | 12/2011 | Lim, II et al. |
| 2012/0012748 A1 | 1/2012 | Pain et al. |
| 2012/0026297 A1 | 2/2012 | Sato |
| 2012/0026342 A1 | 2/2012 | Yu et al. |
| 2012/0026366 A1 | 2/2012 | Golan et al. |
| 2012/0039525 A1 | 2/2012 | Tian et al. |
| 2012/0044249 A1 | 2/2012 | Mashitani et al. |
| 2012/0044372 A1 | 2/2012 | Côté et al. |
| 2012/0056982 A1 | 3/2012 | Katz et al. |
| 2012/0062702 A1 | 3/2012 | Jiang et al. |
| 2012/0069235 A1 | 3/2012 | Imai |
| 2012/0105691 A1 | 5/2012 | Waqas et al. |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0153153 A1 | 6/2012 | Chang et al. |
| 2012/0154551 A1 | 6/2012 | Inoue |
| 2012/0163672 A1 | 6/2012 | McKinnon et al. |
| 2012/0169433 A1 | 7/2012 | Mullins |
| 2012/0170134 A1 | 7/2012 | Bolis et al. |
| 2012/0176479 A1 | 7/2012 | Mayhew et al. |
| 2012/0176481 A1 | 7/2012 | Lukk et al. |
| 2012/0188634 A1 | 7/2012 | Kubala et al. |
| 2012/0198677 A1 | 8/2012 | Duparre |
| 2012/0200734 A1 | 8/2012 | Tang |
| 2012/0206582 A1 | 8/2012 | DiCarlo et al. |
| 2012/0229628 A1 | 9/2012 | Ishiyama et al. |
| 2012/0237114 A1 | 9/2012 | Park et al. |
| 2012/0249550 A1 | 10/2012 | Akeley et al. |
| 2012/0249750 A1 | 10/2012 | Izzat et al. |
| 2012/0262607 A1 | 10/2012 | Shimura et al. |
| 2012/0287291 A1 | 11/2012 | McMahon |
| 2012/0293695 A1 | 11/2012 | Tanaka |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1 | 1/2013 | Do |
| 2013/0022111 A1 | 1/2013 | Chen et al. |
| 2013/0027580 A1 | 1/2013 | Olsen et al. |
| 2013/0033579 A1 | 2/2013 | Wajs |
| 2013/0033585 A1 | 2/2013 | Li et al. |
| 2013/0050504 A1 | 2/2013 | Safaee-Rad et al. |
| 2013/0050526 A1 | 2/2013 | Keelan |
| 2013/0057710 A1 | 3/2013 | Mcmahon |
| 2013/0070060 A1 | 3/2013 | Chatterjee et al. |
| 2013/0077880 A1 | 3/2013 | Venkataraman et al. |
| 2013/0077882 A1 | 3/2013 | Venkataraman et al. |
| 2013/0088637 A1 | 4/2013 | Duparre |
| 2013/0093842 A1 | 4/2013 | Yahata |
| 2013/0113899 A1 | 5/2013 | Morohoshi et al. |
| 2013/0120605 A1 | 5/2013 | Georgiev et al. |
| 2013/0128068 A1 | 5/2013 | Georgiev et al. |
| 2013/0128069 A1 | 5/2013 | Georgiev et al. |

(56) References Cited

U.S. PATENT DOCUMENTS

| | | |
|---|---|---|
| 2013/0128087 A1 | 5/2013 | Georgiev et al. |
| 2013/0128121 A1 | 5/2013 | Agarwala et al. |
| 2013/0147979 A1 | 6/2013 | McMahon et al. |
| 2013/0215108 A1 | 8/2013 | McMahon et al. |
| 2013/0222556 A1 | 8/2013 | Shimada |
| 2013/0229540 A1 | 9/2013 | Farina et al. |
| 2013/0250150 A1 | 9/2013 | Malone |
| 2013/0259317 A1 | 10/2013 | Gaddy |
| 2013/0265459 A1 | 10/2013 | Duparre et al. |
| 2013/0274596 A1 | 10/2013 | Azizian et al. |
| 2014/0009586 A1 | 1/2014 | McNamer et al. |
| 2014/0037137 A1 | 2/2014 | Broaddus et al. |
| 2014/0037140 A1 | 2/2014 | Benhimane et al. |
| 2014/0076336 A1 | 3/2014 | Clayton et al. |
| 2014/0078333 A1 | 3/2014 | Miao |
| 2014/0079336 A1 | 3/2014 | Venkataraman et al. |
| 2014/0092281 A1 | 4/2014 | Nisenzon et al. |
| 2014/0104490 A1 | 4/2014 | Hsieh et al. |
| 2014/0118493 A1 | 5/2014 | Sali et al. |
| 2014/0118584 A1 | 5/2014 | Lee et al. |
| 2014/0132810 A1 | 5/2014 | McMahon |
| 2014/0176592 A1 | 6/2014 | Wilburn et al. |
| 2014/0192154 A1 | 7/2014 | Jeong et al. |
| 2014/0192253 A1 | 7/2014 | Laroia |
| 2014/0198188 A1 | 7/2014 | Izawa |
| 2014/0218546 A1 | 8/2014 | Mcmahon |
| 2014/0232822 A1 | 8/2014 | Venkataraman et al. |
| 2014/0240528 A1 | 8/2014 | Venkataraman et al. |
| 2014/0240529 A1 | 8/2014 | Venkataraman et al. |
| 2014/0253738 A1 | 9/2014 | Mullis |
| 2014/0267243 A1 | 9/2014 | Venkataraman et al. |
| 2014/0267286 A1 | 9/2014 | Duparre |
| 2014/0267762 A1 | 9/2014 | Mullis et al. |
| 2014/0267890 A1 | 9/2014 | Lelescu et al. |
| 2014/0285675 A1 | 9/2014 | Mullis |
| 2014/0321712 A1 | 10/2014 | Ciurea et al. |
| 2014/0333731 A1 | 11/2014 | Venkataraman et al. |
| 2014/0333764 A1 | 11/2014 | Venkataraman et al. |
| 2014/0333787 A1 | 11/2014 | Venkataraman et al. |
| 2014/0340539 A1 | 11/2014 | Venkataraman et al. |
| 2014/0347509 A1 | 11/2014 | Venkataraman et al. |
| 2014/0354773 A1 | 12/2014 | Venkataraman et al. |
| 2014/0354843 A1 | 12/2014 | Venkataraman et al. |
| 2014/0354844 A1 | 12/2014 | Venkataraman et al. |
| 2014/0354853 A1 | 12/2014 | Venkataraman et al. |
| 2014/0354854 A1 | 12/2014 | Venkataraman et al. |
| 2014/0354855 A1 | 12/2014 | Venkataraman et al. |
| 2014/0355870 A1 | 12/2014 | Venkataraman et al. |
| 2014/0368662 A1 | 12/2014 | Venkataraman et al. |
| 2014/0368683 A1 | 12/2014 | Venkataraman et al. |
| 2014/0368684 A1 | 12/2014 | Venkataraman et al. |
| 2014/0368685 A1 | 12/2014 | Venkataraman et al. |
| 2014/0368686 A1 | 12/2014 | Duparre |
| 2014/0369612 A1 | 12/2014 | Venkataraman et al. |
| 2014/0369615 A1 | 12/2014 | Venkataraman et al. |
| 2014/0376825 A1 | 12/2014 | Venkataraman et al. |
| 2014/0376826 A1 | 12/2014 | Venkataraman et al. |
| 2015/0002734 A1 | 1/2015 | Lee |
| 2015/0003752 A1 | 1/2015 | Venkataraman et al. |
| 2015/0003753 A1 | 1/2015 | Venkataraman et al. |
| 2015/0009353 A1 | 1/2015 | Venkataraman et al. |
| 2015/0009354 A1 | 1/2015 | Venkataraman et al. |
| 2015/0009362 A1 | 1/2015 | Venkataraman et al. |
| 2015/0015669 A1 | 1/2015 | Venkataraman et al. |
| 2015/0036014 A1 | 2/2015 | Lelescu et al. |
| 2015/0036015 A1 | 2/2015 | Lelescu et al. |
| 2015/0042766 A1 | 2/2015 | Ciurea et al. |
| 2015/0042767 A1 | 2/2015 | Ciurea et al. |
| 2015/0042833 A1 | 2/2015 | Lelescu et al. |
| 2015/0049915 A1 | 2/2015 | Ciurea et al. |
| 2015/0049916 A1 | 2/2015 | Ciurea et al. |
| 2015/0049917 A1 | 2/2015 | Ciurea et al. |
| 2015/0055884 A1 | 2/2015 | Venkataraman et al. |
| 2015/0085174 A1 | 3/2015 | Shabtay et al. |
| 2015/0146029 A1 | 5/2015 | Venkataraman et al. |
| 2015/0146030 A1 | 5/2015 | Venkataraman et al. |

FOREIGN PATENT DOCUMENTS

| | | |
|---|---|---|
| EP | 2336816 A2 | 6/2011 |
| JP | 11142609 A | 5/1999 |
| JP | 11223708 A | 8/1999 |
| JP | 2002205310 A | 7/2002 |
| JP | 2003094445 A | 4/2003 |
| JP | 2005116022 A | 4/2005 |
| JP | 2005181460 A | 7/2005 |
| JP | 2006033493 A | 2/2006 |
| JP | 2006258930 A | 9/2006 |
| JP | 2007520107 A | 7/2007 |
| JP | 2008055908 A | 3/2008 |
| JP | 2009132010 A | 6/2009 |
| JP | 2011109484 A | 6/2011 |
| JP | 2013526801 A | 6/2013 |
| JP | 2014521117 A | 8/2014 |
| KR | 1020110097647 A | 8/2011 |
| WO | 2007083579 A1 | 7/2007 |
| WO | 2008108271 A1 | 9/2008 |
| WO | 2009151903 A2 | 12/2009 |
| WO | 2011063347 A2 | 5/2011 |
| WO | 2011116203 A1 | 9/2011 |
| WO | 2011/063347 A3 | 10/2011 |
| WO | 2011143501 A1 | 11/2011 |
| WO | 2012057619 A1 | 5/2012 |
| WO | 2012057620 A2 | 5/2012 |
| WO | 2012057621 A1 | 5/2012 |
| WO | 2012057622 A1 | 5/2012 |
| WO | 2012057623 A1 | 5/2012 |
| WO | 2012057620 A3 | 6/2012 |
| WO | 2012074361 A1 | 6/2012 |
| WO | 2012078126 A1 | 6/2012 |
| WO | 2012082904 A1 | 6/2012 |
| WO | 2012155119 A1 | 11/2012 |
| WO | 2013003276 A1 | 1/2013 |
| WO | 2013043751 A1 | 3/2013 |
| WO | 2013043761 A1 | 3/2013 |
| WO | 2013049699 A1 | 4/2013 |
| WO | 2013055960 A1 | 4/2013 |
| WO | 2013119706 A1 | 8/2013 |
| WO | 2013126578 A1 | 8/2013 |
| WO | 2014052974 A2 | 4/2014 |
| WO | 2014032020 A3 | 5/2014 |
| WO | 2014078443 A1 | 5/2014 |
| WO | 2014130849 A1 | 8/2014 |
| WO | 2014133974 A1 | 9/2014 |
| WO | 2014138695 A1 | 9/2014 |
| WO | 2014138697 A1 | 9/2014 |
| WO | 2014144157 A1 | 9/2014 |
| WO | 2014145856 A1 | 9/2014 |
| WO | 2014149403 A1 | 9/2014 |
| WO | 2014150856 A1 | 9/2014 |
| WO | 2014159721 A1 | 10/2014 |
| WO | 2014159779 A1 | 10/2014 |
| WO | 2014160142 A1 | 10/2014 |
| WO | 2014164550 A2 | 10/2014 |
| WO | 2014164909 A1 | 10/2014 |
| WO | 2014165244 A1 | 10/2014 |

OTHER PUBLICATIONS

International Search Report and Written Opinion for International Application No. PCT/US2013/039155, Search completed Jul. 1, 2013, Mailed Jul. 11, 2013, 11 Pgs.
US 8,957,977, 2/2015, Venkataraman et al. (withdrawn).
US 8,964,053, 2/2015, Venkataraman et al. (withdrawn).
US 8,965,058, 2/2015, Venkataraman et al. (withdrawn).
Extended European Search Report for European Application EP12782935.6, report completed Aug. 28, 2014 Mailed Sep. 4, 2014, 6 Pgs.
Extended European Search Report for European Application EP12835041.0, Report Completed Jan. 28, 2015, Mailed Feb. 4, 2015, 6 Pgs.

(56) References Cited

OTHER PUBLICATIONS

International Preliminary Report on Patentability for International Application PCT/US2013/056065, Report Issued Feb. 24, 2015, Mailed Mar. 5, 2015, 4 Pgs.
International Preliminary Report on Patentability for International Application PCT/US2013/048772, Report issued Dec. 31, 2014, Mailed Jan. 8, 2015, 8 Pgs.
International Preliminary Report on Patentability for International Application PCT/US2013/056502, Report Issued Feb. 24, 2015, Mailed Mar. 5, 2015, 7 Pgs.
International Preliminary Report on Patentability for International Application PCT/US2014/030692, Report issued Sep. 15, 2015, Mailed Sep. 24, 2015, 6 Pgs.
International Search Report and Written Opinion for International Application No. PCT/US2009/044687, date completed Jan. 5, 2010, date mailed Jan. 13, 2010, 9 pgs.
International Search Report and Written Opinion for International Application PCT/US2014/017766, report completed May 28, 2014, Mailed Jun. 18, 2014, 9 Pgs.
International Search Report and Written Opinion for International Application PCT/US14/25904 report completed Jun. 10, 2014, Mailed Jul. 10, 2014, 6 Pgs.
International Search Report and Written Opinion for International Application PCT/US2014/028447, report completed Jun. 30, 2014, Mailed Jul. 21, 2014, 8 Pgs.
Chen Z., "KNN Matting", IEEE Transactions on Pattern Analysis and Machine Intelligence, Sep. 2013, vol. 35, No. 9, pp. 2175-2188.
Lai et al., "A Large-Scale Hierarchical Multi-View RGB-D Object Dataset", May 2011, 8 pgs.
Levin et al., "A Closed Form Solution to Natural Image Matting", Pattern Analysis and Machine Intelligence, Feb. 2008, vol. 30, 8 pgs.
Nguyen, HA T. et al., "Image-Based Rendering with Depth Information Using the Propagation Algorithm", Nguyen et al., Image-Based Rendering With Depth Information Using the Propagation Algorithm, 2005, IEEE, ICASSP, pp. 1-4.
Perwass et al., "Single Lens 3D-Camera with Extended Depth-of-Field", printed from www.raytrix.de, Jan. 2012, 15 pgs.
Tallon et al., "Upsampling and Denoising of Depth Maps via Joint-Segmentation", 20th European Signal Processing Conference, Aug. 27-31, 2012, 5 pgs.
Yang et al., "A Real-Time Distributed Light Field Camera", Eurographics Workshop on Rendering (2002), pp. 1-10.
Zhang, Qiang et al., "Depth estimation, spatially variant image registration, and super-resolution using a multi-lenslet camera", Proceedings of SPIE, vol. 7705, Apr. 23, 2010, pp. 770505-770505-8, XP055113797 ISSN: 0277-786X, DOI: 10.1117/12.852171.
International Search Report and Written Opinion for International Application PCT/US2014/067740, Report Completed Jan. 29, 2015, Mailed Mar. 3, 2015, 10 pgs.
International Search Report and Written Opinion for International Application No. PCT/US13/46002, Search Completed Nov. 13, 2013, Mailed Nov. 29, 2013, 7 pgs.
International Search Report and Written Opinion for International Application No. PCT/US13/48772, Search Completed Oct. 21, 2013, Mailed Nov. 8, 2013, 6 pgs.
International Search Report and Written Opinion for International Application No. PCT/US13/56065, Search Completed Nov. 25, 2013, Mailed Nov. 26, 2013, 8 pgs.
International Search Report and Written Opinion for International Application No. PCT/US13/59991, Search Completed Feb. 6, 2014, Mailed Feb. 26, 2014, 8 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/056502, Search Completed Feb. 18, 2014, Mailed Mar. 19, 2014, 7 pgs.

International Search Report and Written Opinion for International Application No. PCT/US2013/069932, Search Completed Mar. 14, 2014, Mailed Apr. 14, 2014, 12 pgs.
IPRP for International Application No. PCT/US2012/059813, International Filing Date Oct. 11, 2012, Search Completed Apr. 15, 2014, 7 pgs.
International Search Report and Written Opinion for International Application PCT/US11/36349, mailed Aug. 22, 2011, 12 pgs.
International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/027146, completed Apr. 2, 2013, 12 pgs.
International Search Report and Written Opinion for International Application PCT/US14/18084, completed May 23, 2014, 12 pgs.
International Search Report and Written Opinion for International Application PCT/US2009/044687, completed Jan. 5, 2010, 13 pgs.
International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, completed Dec. 17, 2012, 8 pgs.
International Search Report and Written Opinion for International Application PCT/US12/37670, Mailed Jul. 18, 2012, Search Completed Jul. 5, 2012, 9 pgs.
International Search Report and Written Opinion for International Application PCT/US2012/58093, completed Nov. 15, 2012, 12 pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200, 2011.
Bishop et al., "Light Field Superresolution", Retrieved from http://home.eps.hw.ac.uk/~sz73/ICCP09/LightFieldSuperresolution.pdf, 9 pgs. 9.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame Map Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.

(56) References Cited

OTHER PUBLICATIONS

Bose et al., "Superresolution and Noise Filtering Using Moving Least Squares", IEEE Transactions on Image Processing, date unknown, 21 pgs.

Boye et al., "Comparison of Subpixel Image Registration Algorithms", Proc. of SPIE-IS&T Electronic Imaging, vol. 7246, pp. 72460X-1-72460X-9.

Bruckner et al., "Artificial compound eye applying hyperacuity", Optics Express, Dec. 11, 2006, vol. 14, No. 25, pp. 12076-12084.

Bruckner et al., "Driving microoptical imaging systems towards miniature camera applications", Proc. SPIE, Micro-Optics, 2010, 11 pgs.

Bruckner et al., "Thin wafer-level camera lenses inspired by insect compound eyes", Optics Express, Nov. 22, 2010, vol. 18, No. 24, pp. 24379-24394.

Capel, "Image Mosaicing and Super-resolution", [online], Retrieved on Nov. 10, 2012. Retrieved from the Internet at URL:<http://citeseerx.ist.psu.edu/viewdoc/download?doi=10.1.1.226.2643&rep=rep1&type=pdf>, Title pg., abstract, table of contents, pp. 1-263 (269 total pages).

Chan et al., "Extending the Depth of Field in a Compound-Eye Imaging System with Super-Resolution Reconstruction", Proceedings—International Conference on Pattern Recognition, 2006, vol. 3, pp. 623-626.

Chan et al., "Investigation of Computational Compound-Eye Imaging System with Super-Resolution Reconstruction", IEEE, ISASSP 2006, pp. 1177-1180.

Chan et al., "Super-resolution reconstruction in a computational compound-eye imaging system", Multidim. Syst. Sign Process, 2007, vol. 18, pp. 83-101.

Drouin et al., "Fast Multiple-Baseline Stereo with Occlusion", Proceedings of the Fifth International Conference on 3-D Digital Imaging and Modeling, 2005, 8 pgs.

Drouin et al., "Geo-Consistency for Wide Multi-Camera Stereo", Proceedings of the 2005 IEEE Computer Society Conference on Computer Vision and Pattern Recognition, 2005, 8 pgs.

Drouin et al., "Improving Border Localization of Multi-Baseline Stereo Using Border-Cut", International Journal of Computer Vision, Jul. 2009, vol. 83, Issue 3, 8 pgs.

Duparre et al., "Artificial apposition compound eye fabricated by micro-optics technology", Applied Optics, Aug. 1, 2004, vol. 43, No. 22, pp. 4303-4310.

Duparre et al., "Artificial compound eye zoom camera", Bioinspiration & Biomimetics, 2008, vol. 3, pp. 1-6.

Duparre et al., "Artificial compound eyes—different concepts and their application to ultra flat image acquisition sensors", MOEMS and Miniaturized Systems IV, Proc. SPIE 5346, Jan. 2004, pp. 89-100.

Duparre et al., "Chirped arrays of refractive ellipsoidal microlenses for aberration correction under oblique incidence", Optics Express, Dec. 26, 2005, vol. 13, No. 26, pp. 10539-10551.

Duparre et al., "Micro-optical artificial compound eyes", Bioinspiration & Biomimetics, 2006, vol. 1, pp. R1-R16.

Duparre et al., "Microoptical artificial compound eyes—from design to experimental verification of two different concepts", Proc. of SPIE, Optical Design and Engineering II, vol. 5962, pp. 59622A-1-59622A-12.

Duparre et al., "Microoptical Artificial Compound Eyes—Two Different Concepts for Compact Imaging Systems", 11th Microoptics Conference, Oct. 30-Nov. 2, 2005, 2 pgs.

Duparre et al., "Microoptical telescope compound eye", Optics Express, Feb. 7, 2005, vol. 13, No. 3, pp. 889-903.

Duparre et al., "Micro-optically fabricated artificial apposition compound eye", Electronic Imaging—Science and Technology, Prod. SPIE 5301, Jan. 2004, pp. 25-33.

Duparre et al., "Novel Optics/Micro-Optics for Miniature Imaging Systems", Proc. of SPIE, 2006, vol. 6196, pp. 619607-1-619607-15.

Duparre et al., "Theoretical analysis of an artificial superposition compound eye for application in ultra flat digital image acquisition devices", Optical Systems Design, Proc. SPIE 5249, Sep. 2003, pp. 408-418.

Duparre et al., "Thin compound-eye camera", Applied Optics, May 20, 3005, vol. 44, No. 15, pp. 2949-2956.

Duparre et al., "Ultra-Thin Camera Based on Artificial Apposistion Compound Eyes", 10th Microoptics Conference, Sep. 1-3, 2004, 2 pgs.

Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs., Aug. 2009.

Farrell et al., "Resolution and Light Sensitivity Tradeoff with Pixel Size", Proceedings of the SPIE Electronic Imaging 2006 Conference, 2006, vol. 6069, 8 pgs.

Farsiu et al., "Advances and Challenges in Super-Resolution", International Journal of Imaging Systems and Technology, 2004, vol. 14, pp. 47-57.

Farsiu et al., "Fast and Robust Multiframe Super Resolution", IEEE Transactions on Image Processing, Oct. 2004, vol. 13, No. 10, pp. 1327-1344.

Farsiu et al., "Multiframe Demosaicing and Super-Resolution of Color Images", IEEE Transactions on Image Processing, Jan. 2006, vol. 15, No. 1, pp. 141-159.

Feris et al., "Multi-Flash Stereopsis: Depth Edge Preserving Stereo with Small Baseline Illumination", IEEE Trans on PAMI, 2006, 31 pgs.

Fife et al., "A 3D Multi-Aperture Image Sensor Architecture", Custom Integrated Circuits Conference, 2006, CICC '06, IEEE, pp. 281-284.

Fife et al., "A 3MPixel Multi-Aperture Image Sensor with 0.7Mu Pixels in 0.11Mu CMOS", ISSCC 2008, Session 2, Image Sensors & Technology, 2008, pp. 48-50.

Fischer et al., Optical System Design, 2nd Edition, SPIE Press, pp. 191-198.

Fischer et al., "Optical System Design, 2nd Edition, SPIE Press, pp. 49-58".

Hamilton, "JPEG File Interchange Format, Version 1.02", Sep. 1, 1992, 9 pgs.

Hardie, "A Fast Image Super-Algorithm Using an Adaptive Wiener Filter", IEEE Transactions on Image Processing, Dec. 2007, vol. 16, No. 12, pp. 2953-2964.

Horisaki et al., "Irregular Lens Arrangement Design to Improve Imaging Performance of Compound-Eye Imaging Systems", Applied Physics Express, 2010, vol. 3, pp. 022501-1-022501-3.

Horisaki et al., "Superposition Imaging for Three-Dimensionally Space-Invariant Point Spread Functions", Applied Physics Express, 2011, vol. 4, pp. 112501-1-112501-3.

Kang et al., "Handling Occlusions inn Dense Multi-View Stereo", Computer Vision and Pattern Recognition, 2001, vol. 1, pp. 1-103-1-110.

Kitamura et al., "Reconstruction of a high-resolution image on a compound-eye image-capturing system", Applied Optics, Mar. 10, 2004, vol. 43, No. 8, pp. 1719-1727.

Krishnamurthy et al., "Compression and Transmission of Depth Maps for Image-Based Rendering", Image Processing, 2001, pp. 828-831.

Kutulakos et al., "Occluding Contour Detection Using Affine Invariants and Purposive Viewpoint Control", Proc., CVPR 94, 8 pgs.

Lensvector, "How LensVector Autofocus Works", printed Nov. 2, 2012 from http://www.lensvector.com/overview.html, 1 pg.

Levoy, "Light Fields and Computational Imaging", IEEE Computer Society, Aug. 2006, pp. 46-55.

Levoy et al., "Light Field Rendering", Proc. ADM SIGGRAPH '96, pp. 1-12.

Li et al., "A Hybrid Camera for Motion Deblurring and Depth Map Super-Resolution," Jun. 23-28, 2008, IEEE Conference on Computer Vision and Pattern Recognition, 8 pgs. Retrieved from www.eecis.udel.edu/~jye/lab_research/08/deblur-feng.pdf on Feb. 5, 2014.

(56) References Cited

OTHER PUBLICATIONS

Liu et al., "Virtual View Reconstruction Using Temporal Information", 2012 IEEE International Conference on Multimedia and Expo, 2012, pp. 115-120.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html—11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander, et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intel!, 2013, vol. 35, No. 2, pp. 504-511.
Robertson et al., "Dynamic Range Improvement Through Multiple Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.
Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, 9 (Sep.), 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Marland, College Park-Observational Astronomy (ASTR 310), Oct. 19, 2006, pp. 1-5 (online), [retrieved on May 13, 2014]. Retrieved from the Internet <URL: http://www.astro.umd.edu/~veilleux/ASTR310/fall06/ccd_theory.pdf, Oct. 19, 2006, 1-5.
Vuong et al., "A New Auto Exposure and Auto White-Balance Algorithm to Detect High Dynamic Range Conditions Using CMOS Technology", , Proceedings of the World Congress on Engineering and Computer Science 2008, WCECS 2008, Oct. 22-24, 2008.
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter_(photography), 1 pg.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "Superresolution Using Preconditioned Conjugate Gradient Method", Source and date unknown, 8 pgs.
Zhang, Cha et al., "A Self-Reconfigurable Camera Array", Eurographics Symposium on Rendering, 2004, 12 pgs.
Zomet et al., "Robust Super-Resolution", IEEE, 2001, pp. 1-6.
International Search Report and Written Opinion for International Application PCT/US 14/23762, Completed May 30, 2014, Mailed Jul. 3, 2014, 6 Pages.
International Search Report and Written Opinion for International Application PCT/US14/24903, Completed Jun. 12, 2014, Mailed Jun. 27, 2014, 13 Pages.
International Search Report and Written Opinion for International Application PCT/US14/17766, completed May 28, 2014, Mailed Jun. 18, 2014, 9 Pages.
International Search Report and Written Opinion for International Application PCT/US14/18116, completed May 13, 2014, Mailed Jun. 2, 2014, 12 pages.
International Search Report and Written Opinion for International Application PCT/US14/22118, Completed Jun. 9, 2014, Mailed Jun. 25, 2014, 5 Pages.
International Search Report and Written Opinion for International Application PCT/US14/24407, Completed Jun. 11, 2014, Mailed Jul. 8, 2014, 9 Pages.
International Search Report and Written Opinion for International Application PCT/US14/22123, Completed Jun. 9, 2014, Mailed Jun. 25, 2014, 5 Pages.
International Search Report and Written Opinion for International Application PCT/US14/24947, Completed Aug. 5, 2014, Mailed Aug. 5, 2014, 8 Pgs.

(56) References Cited

OTHER PUBLICATIONS

International Search Report and Written Opinion for International Application PCT/US13/62720, International Filing Date Sep. 30, 2013, report completed Mar. 25, 2014, Mailed Apr. 21, 2014, 9 pages.

International Search Report and Written Opinion for International Application PCT/US14/25100, International Filing Date Mar. 12, 2014, report completed Jul. 7, 2014, Mailed Aug. 7, 2014, 5 pages.

International Search Report and Written Opinion for International Application PCT/US2014/030692, International Filing Date Mar. 17, 2014, report completed Jul. 28, 2014, Mailed Aug. 27, 2014, 7 pages.

Chen et al., "Interactive deformation of light fields", In Proceedings of SIGGRAPH I3D 2005, pp. 139-146.

Goldman et al., "Video Object Annotation, Navigation, and Composition", In Proceedings of UIST 2008, pp. 3-12.

Gortler et al., "The Lumigraph", In Proceedings of SIGGRAPH 1996, pp. 43-54.

Hacohen et al., "Non-Rigid Dense Correspondence with Applications for Image Enhancement", ACM Transactions on Graphics, 30, 4, 2011, pp. 70:1-70:10.

Hasinoff et al., "Search-and-Replace Editing for Personal Photo Collections", Computational Photography (ICCP) 2010, pp. 1-8.

Horn et al., "LightShop: Interactive Light Field Manipulation and Rendering", In Proceedings of I3D 2007, pp. 121-128.

Isaksen et al., "Dynamically Reparameterized Light Fields", In Proceedings of SIGGRAPH 2000, pp. 297-306.

Jarabo et al., "Efficient Propagation of Light Field Edits", In Proceedings of SIACG 2011, pp. 75-80.

Lo et al., "Stereoscopic 3D Copy & Paste", ACM Transactions on Graphics, vol. 29, No. 6, Article 147, Dec. 2010, pp. 147:1-147:10.

Neel, Joshi et al., "Synthetic Aperture Tracking: Tracking Through Occlusions", I CCV IEEE 11th International Conference on Computer Vision, Oct. 2007, Retrieved from http:I/ieeexplore.ieee.org/stamp/stamp.jsp?tp=&arnumber=4409032&isnumber=4408819 on Jul. 28, 2014, pp. 1-8.

Seitz et al., "Plenoptic Image Editing", International Journal of Computer Vision 48, 2, pp. 115-129.

International Preliminary Report on Patentability for International Application PCT/US2014/067740, Report issued May 31, 2016, Mailed Jun. 9, 2016, 9 Pgs.

\* cited by examiner

SYSTEMS AND METHODS FOR STEREO IMAGING WITH CAMERA ARRAYS

CROSS-REFERENCE TO RELATED APPLICATIONS

The current application claims priority to U.S. Provisional Application No. 61/798,673, filed Mar. 15, 2013, the disclosure of which is incorporated herein by reference in its entirety.

FIELD OF THE INVENTION

The present invention relates to stereo imaging with camera arrays and how this extends the core capabilities of a single monolithic light field camera array.

BACKGROUND

An image captured by a digital camera provides some sense of the location of objects in a scene and the location of one object relative to another. Without information in a third dimension (depth), it can be difficult to make strict conclusions about locations and linear measurements.

A legacy stereo camera is a type of camera with two or more lenses with a separate image sensor for each lens. This allows the camera to simulate human binocular vision and the ability to capture three-dimensional (stereo) images. A legacy stereo camera has some ability to determine depth of objects in its field of view when the baseline, or distance, between the two cameras is known.

An array camera includes a plurality of individual imagers (i.e., cameras) that can capture images of a scene where the image obtained by each imager is from a slightly different viewpoint. The diversity of information between viewpoints can be used to calculate depth information. The depth calculations in an array camera are more sophisticated than in a stereo camera because additional combinations of images, from different cameras in the array, can be compared and correlated to make the estimates more robust in the presence of noise and aliasing. An array camera system typically still has reduced precision in determining depth beyond a certain distance from the camera because the information used to calculate depth becomes less diverse in magnitude the farther an object is from the camera.

SUMMARY OF THE INVENTION

Systems and methods for stereo imaging with camera arrays in accordance with embodiments of the invention are disclosed. In one embodiment, a method of generating depth information for an object in a scene using two or more array cameras that each include a plurality of imagers where each imager captures an image of the scene includes obtaining a first set of image data including image data of a scene captured from a first set of different viewpoints, identifying an object of interest in the first set of image data, determining a first depth measurement for the object of interest using at least a portion of the first set of image data, determining whether the first depth measurement for the object of interest is above a predetermined threshold, and when the depth for the object of interest is above the predetermined threshold: obtaining a second set of image data including image data of the same scene from a second set of different viewpoints located known distances from at least one viewpoint in the first set of different viewpoints, identifying the object of interest in the second set of image data, and determining a second depth measurement for the object of interest using at least a portion of the first set of image data and at least a portion of the second set of image data.

In a further embodiment, obtaining a first set of image data including image data of a scene captured from a first set of different viewpoints includes capturing a first set of image data using a first plurality of imagers in a first array.

Another embodiment also includes determining image capture settings for active imagers in the first array.

In a still further embodiment, determining image capture settings for active imagers in the first array includes calibrating for nonlinearities in the lenses of a plurality of the first plurality of imagers.

In still another embodiment, one of the imagers is designated as a reference camera and captures image data from a reference viewpoint.

In a yet further embodiment, identifying an object of interest in the first set of image data includes generating a preview image, presenting the preview image via a screen, and capturing user input.

In yet another embodiment, identifying an object of interest in the first set of image data includes detecting motion in an area of the scene.

In a further embodiment again, identifying an object of interest in the first set of image data includes detecting an object in a designated region of interest.

In another embodiment again, identifying an object of interest in the first set of image data includes selecting one or more pixels and associating the one or more pixels with the object.

In a further additional embodiment, obtaining a second set of image data including image data of the same scene from a second set of different viewpoints located known distances from at least one viewpoint in the first set of different viewpoints includes capturing a second set of image data using a second plurality of imagers in a second array.

In another additional embodiment, the second array is the first array placed in a different location from the location in which the first array captured the first set of image data.

A still yet further embodiment also includes estimating the baseline distance between the two arrays by cross-correlating one or more sets of corresponding pixels from the first set of image data and the second set of image data.

In still yet another embodiment, determining a first depth measurement for the object of interest using at least a portion of the first set of image data includes determining the disparity between the location of a pixel in one image in the first set of image data and a corresponding pixel in a second image in the first set of image data.

A still further embodiment again also includes calculating a confidence measure for the depth of the object of interest.

A still another embodiment again also includes determining if the object of interest is visible in the second set of image data and identifying the object of interest in the second set of image data when the object of interest is visible in the second set of image data.

In a still further additional embodiment, determining a second depth measurement for the object of interest using at least a portion of the first set of image data and at least a portion of the second set of image data includes determining the disparity between a first pixel associated with the object of interest in at least one image in the first set of image data and a corresponding second pixel in at least one image in the second set of image data.

In still another additional embodiment, determining a second depth measurement for the object of interest using at least a portion of the first set of image data and at least a portion of the second set of image data includes calculating the disparity between the location of a pixel in one image in the first set of image data and a corresponding pixel in a second image in the second set of image data.

In a yet further embodiment again, determining a second depth measurement for the object of interest using at least a portion of the first set of image data and at least a portion of the second set of image data includes utilizing the first depth measurement for the object of interest.

In yet another embodiment again, a method for calculating the speed of an object in a scene using one or more array cameras that each include a plurality of imagers where each imager captures an image of the scene includes obtaining a first set of image data including image data of a scene captured from a first set of different viewpoints, identifying an object of interest in the first set of image data, determining a first depth measurement and a first angular measurement for the object of interest using at least a portion of the first set of image data, determining a first location of the object of interest using at least the first depth measurement and first angular measurement, obtaining a second set of image data including a second image data of a scene captured from a second set of different viewpoints at a time t after the first set of image data was captured, identifying the object of interest in the second set of image data, determining a second depth measurement and a second angular measurement for the object of interest using at least a portion of the second set of image data, determining a second location of the object of interest using at least the second depth measurement and second angular measurement, calculating a speed for the object of interest using at least the first location and the second location of the object of interest.

In a yet further additional embodiment, obtaining a first set of image data including image data of a scene captured from a first set of different viewpoints includes capturing a first set of image data using a first plurality of imagers in a first array, and obtaining a second set of image data including a second image data of a scene captured from a second set of different viewpoints at a time t after the first set of image data was captured includes capturing a second set of image data using a second plurality of imagers at a time t after the first set of image data was captured.

In yet another additional embodiment, the second plurality of imagers is the same as the first plurality of imagers and the second set of different viewpoints is the same as the first set of different viewpoints.

In a further additional embodiment again, the second plurality of imagers is selected from a second array that is different from the first array.

Another additional embodiment again also includes determining image capture settings for active imagers in the first array.

In a still yet further embodiment again, identifying an object of interest in the first set of image data includes generating a preview image, presenting the preview image via a screen, and capturing user input.

In still yet another embodiment again, identifying an object of interest in the first set of image data includes detecting motion in an area of the scene.

In a still yet further additional embodiment, identifying an object of interest in the first set of image data includes detecting an object in a designated region of interest.

In still yet another additional embodiment, identifying an object of interest in the first set of image data includes selecting one or more pixels and associating the one or more pixels with the object.

In a yet further additional embodiment again, capturing a first set of image data using a first plurality of imagers in a first array includes capturing a first set of image data at a first location, capturing a second set of image data using a second plurality of imagers at a time t after the first set of image data was captured includes capturing a second set of image data in a second location at a time t after the first set of image data was captured, and determining a second location of the object of interest using at least the second depth measurement and second angular measurement includes determining the change from the first location to the second location.

In yet another additional embodiment again, capturing a first set of image data using a first plurality of imagers in a first array includes determining a first orientation of the first array, capturing a second set of image data using a second plurality of imagers at a time t after the first set of image data was captured includes determining a second orientation of the first array at a time t after the first set of image data was captured, and determining a second location of the object of interest using at least the second depth measurement and second angular measurement includes determining the change from the first orientation to the second orientation.

A still yet further additional embodiment again also includes calculating a confidence measure of the speed of the object of interest.

In still yet another additional embodiment again, determining a second depth measurement and a second angular measurement for the object of interest using at least a portion of the second set of image data includes determining a second depth measurement for the object of interest using at least a portion of the first set of image data and at least a portion of the second set of image data.

DETAILED DISCLOSURE OF THE INVENTION

Figure 1:
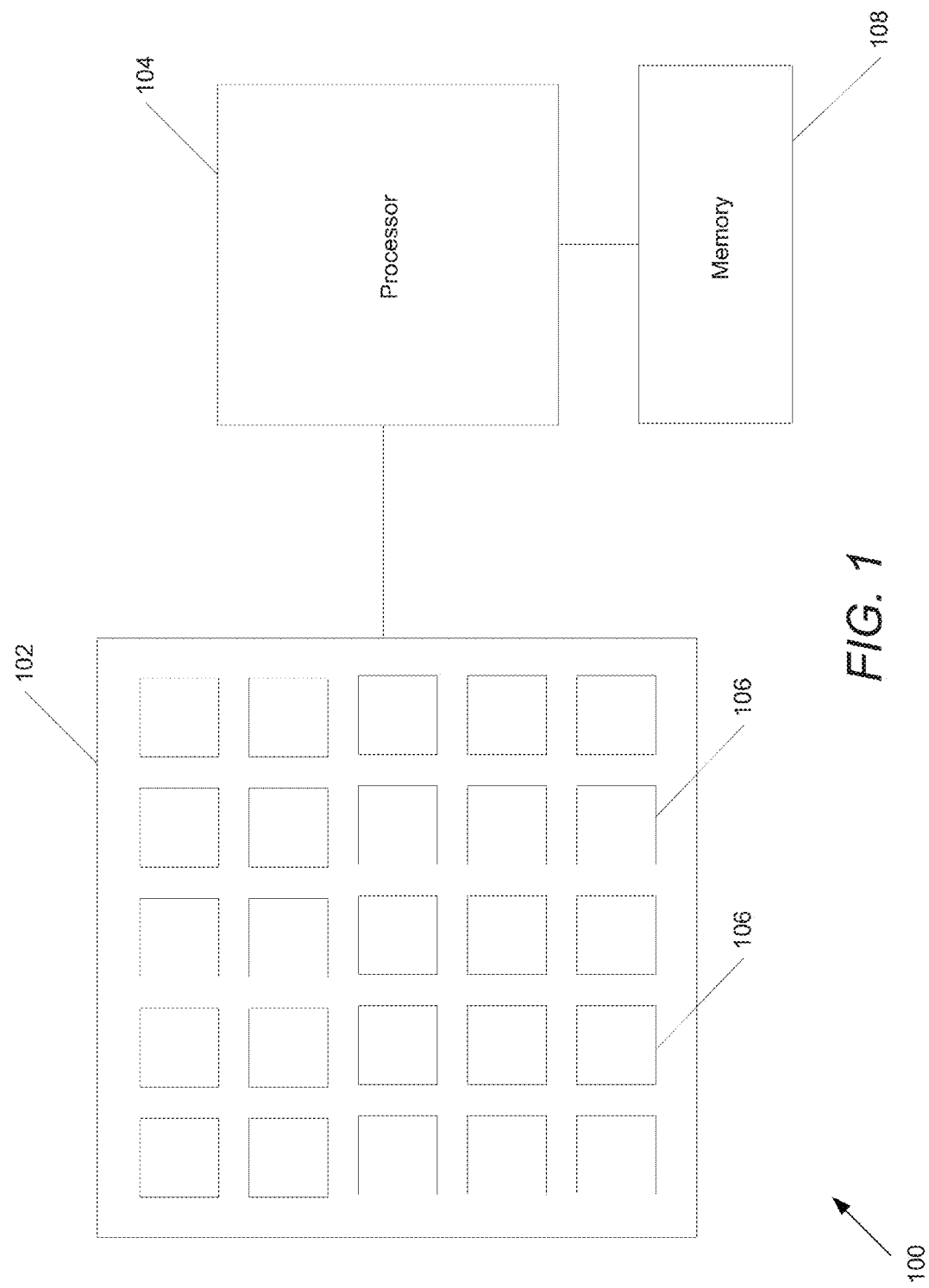
FIG. 1 is a conceptual illustration of an array camera architecture that can be used in a variety of array camera configurations in accordance with embodiments of the invention.

Turning now to the drawings, systems and methods for measuring distance and speed in accordance with embodiments of the invention are illustrated. In many embodiments of the invention, one or more array cameras are utilized to capture image data of a scene from slightly different viewpoints. The diversity of information acquired from different viewpoints can be used to calculate depth of objects in the scene and a depth map that includes a set of depth information for a scene. In many embodiments of the invention, a stereo array camera composed of two array cameras provides depth information that can be used to calculate depth with greater accuracy at distances farther from the camera than can a single array camera. In other embodiments, a stereo array camera is composed of an array camera and a legacy camera (i.e. having a single lens and single image sensor/imager).

Array cameras including camera modules that can be utilized to capture image data from different viewpoints are disclosed in U.S. patent application Ser. No. 12/935,504, entitled "Capturing and Processing of Images using Monolithic Camera Array with Heteregeneous Images", filed May 20, 2009, the disclosure of which is incorporated by reference herein in its entirety. Array cameras offer a number of advantages and features over legacy cameras. An array camera typically contains two or more imagers (which can be referred to as cameras), each of which receives light through a separate lens system. The imagers operate to capture image data of a scene from slightly different viewpoints. Array cameras have a variety of applications, including capturing image data from multiple viewpoints that can be used in super-resolution processing and depth calculation.

Depth of an object of interest can be calculated by observing the disparity, or difference, in the location of corresponding pixels making up the object (pixels that capture the same content in a scene) in the images from two different cameras. As will be discussed further below, the baseline distance between the cameras, back focal length of the cameras, and disparity are factors in determining depth. The accuracy of a depth measurement is reduced with further distance from the camera because the disparity between the cameras of an image for a given object at that distance reduces with increasing distance. Eventually, the disparity gets smaller than a certain threshold sub-pixel amount for the given pixels size, and the resolution of depth measurement thus becomes more coarsely quantized with greater depth. Because increasing the baseline increases disparity, the accuracy of depth measurement can also be increased accordingly with the baseline. In many embodiments of the invention, a stereo array camera configuration includes two array cameras mounted a fixed distance apart. The fixed distance is greater than the distance between the cameras in a single array and the stereo array camera can therefore provide greater accuracy when making depth estimates than a single array.

The depth and two-dimensional location of an object of interest (such as from an image captured by an array camera) can be used to locate the object in three-dimensional space. Given two sets of three-dimensional coordinates of an object and the time elapsed, the object's speed and direction can be calculated to within a certain accuracy depending on the accuracy of the depth estimates in the two measurements. In several embodiments of the invention, speed and direction are calculated for an object from depth and two-dimensional location information determined using an array camera or stereo array camera. Array camera architectures that can be utilized for depth and speed measurements in accordance with embodiments of the invention are discussed below.

Array Camera Architecture

An array camera architecture that can be used in a variety of array camera configurations in accordance with embodiments of the invention is illustrated in FIG. 1. The array camera 100 includes an imager array 102, which is connected to a processor 108. Imagers 106 in the array 102 are evenly spaced in a 5×5 square. In other embodiments, imagers may have different spacing or can be arranged in other orientations in the array. The processor 104 is hardware, software, firmware, or a combination thereof that controls various operating parameters of the imager array 102. The processor 104 can also function to process the images received from imager array 102 to produce a synthesized higher resolution image using super-resolution processes, or transfer the images to other hardware, software, firmware or a combination thereof to process the images. The system can also include memory 108 in communication with the processor 104 for storing images. Architectures for imager arrays that can be utilized in accordance with embodiments of the invention include those disclosed in U.S. patent application Ser. No. 13/106,797, entitled "Architectures for System on Chip Array Cameras" to Pain et al., and U.S. patent application Ser. No. 12/935,504 entitled "Capturing and Processing of Images using Monolithic Camera Array with Heterogeneous Imagers" to Venkataraman et al., the disclosures of which are incorporated herein by reference in their entirety.

Although a specific architecture is illustrated in FIG. 1, any of a variety of architectures including any M×N array of cameras that enable the capture of low resolution images and application of super-resolution processes to produce a synthesized high resolution image can be utilized in accordance with embodiments of the invention.

Stereo Array Cameras

In many embodiments of the invention, two array cameras mounted a fixed distance apart form a pair of stereo array cameras. In other embodiments, an array camera and a legacy camera form a stereo array camera. Each array camera can be of an architecture as described above with respect to FIG. 1. In several embodiments, the array cameras have a similar configuration in features such as, but not limited to, number of cameras, array dimensions, camera resolution, and/or arrangement of color filters. In some embodiments, the active imagers (imagers used to capture image data) in the first and/or second array camera have color filters or other mechanisms such that they are configured to capture the same spectral band of light. The spectral band can be (but is not limited to) red, blue, green, infrared, or extended color. Extended color is a band that includes at least a portion of at the band of wavelengths of least two colors. Systems and methods for capturing and utilizing extended color are described in U.S. Patent Application No. 61/798,602, filed Mar. 15, 2013, entitled "Extended Color Processing on Pelican Array Cameras" and U.S. patent application Ser. No. 14/145,734, filed Dec. 31, 2013, entitled "Extended Color Processing on Pelican Array Cameras," the disclosures of which are hereby incorporated by reference in their entirety. In other embodiments, the array cameras have a different configuration in one or more features as appropriate to a specific application. In many embodiments, the distance between the two arrays (or between the array and legacy camera) is known with reference to one or more locations on each array. In addition, the locations of each camera within each array are known. Therefore, the baseline (distance between any two cameras) between any camera in the first array and any camera in the second array (or legacy camera) is known or can be determined.

Distance Measurement Using Array Cameras

Images of a scene captured by different cameras in an array camera have differences due to the different points of view resulting from the different locations of the cameras, an effect known as parallax. These differences, referred to as disparity, provide information that can be used to measure depth of objects within a scene. Systems and methods for detecting disparity and calculating depth maps for an image are discussed in U.S. Patent Application Ser. No. 61/691,666 entitled "Systems and Methods for Parallax Detection and Correction in Images Captured Using Array Cameras" to Venkataraman et al., filed Aug. 21, 2012, the disclosure of which is incorporated by reference herein in its entirety.

Figure 2:
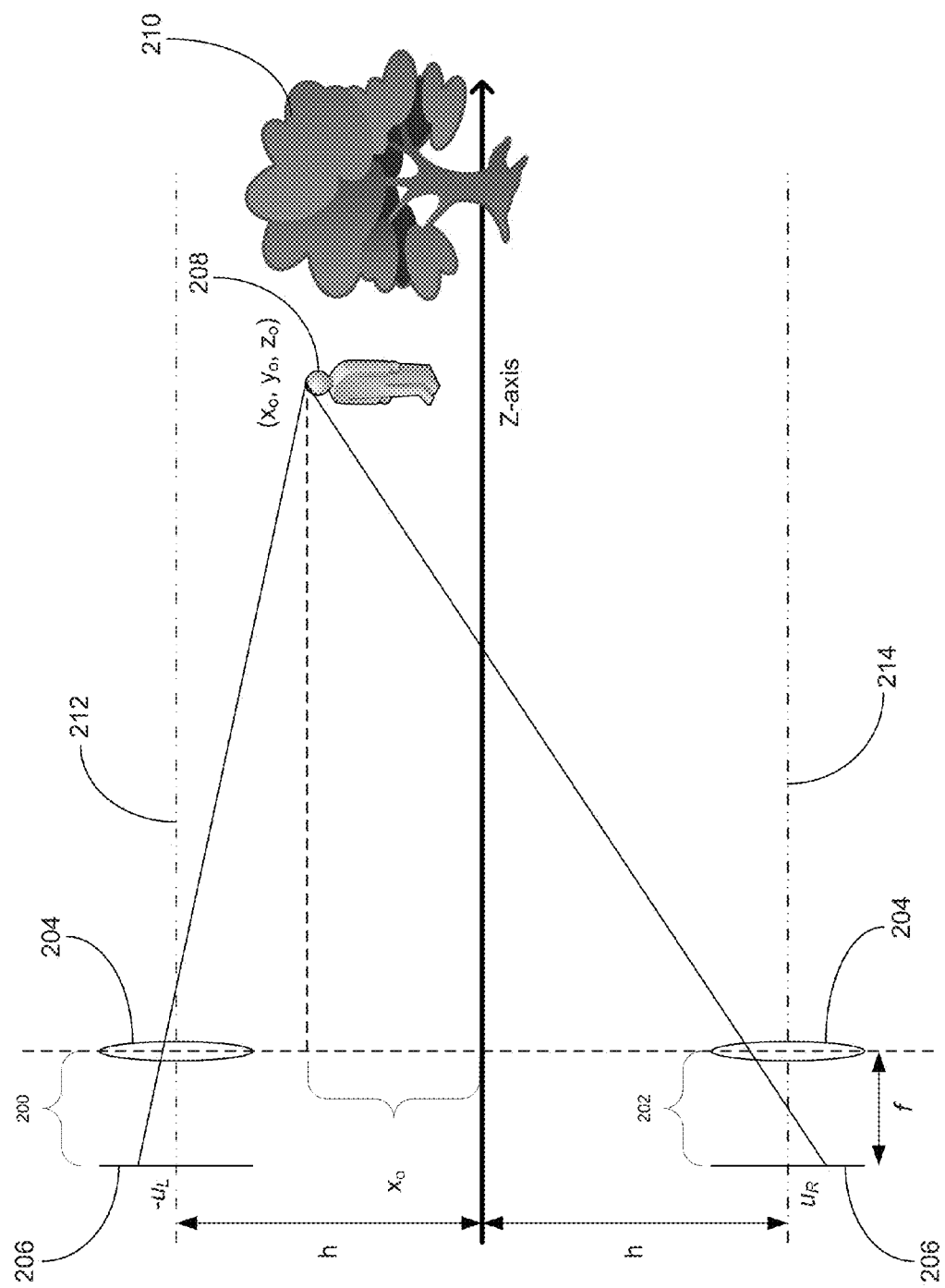
FIG. 2 is an illustration of parallax effects on the images captured in a two camera system.

Parallax in a two camera system is illustrated in FIG. 2. The two cameras 200, 202, include a lens stack 204 and a focal plane 206. Each camera has a back focal length f, and the two cameras are separated by the baseline distance of 2h. The field of view of both cameras encompasses a scene including a foreground object 208 and a background object 210. The disparity introduced by the different fields of view of the two cameras 200, 202, is equal to the difference in location of the foreground object 208 between its location in the image captured by the first camera (represented as an offset of the point on the focal plane of the first camera 200 relative to its optical axis 212 shown as $-u_L$) and its location in the image captured by the second camera (represented as an offset of the point on the focal plane of the second camera 202 relative to its optical axis 214 is shown as $u_R$).

U.S. Patent Application Ser. No. 61/691,666 incorporated above discusses depth measurement using the following relationship between disparity and depth with respect to FIG. 2:

$$\Delta_{parallax} = u_R - u_L = \frac{2hf}{z_o} \quad (1)$$

From the above equation and figure, it can be seen that disparity between images captured by the cameras is along a vector in the direction of the baseline of the two cameras, which can be referred to as the epipolar line between the two cameras. Furthermore, the magnitude of the disparity is directly proportional to the baseline separation of the two cameras and the back focal length of the cameras and is inversely proportional to the distance from the camera to an object appearing in the scene. The distance (or depth) from the two cameras to the foreground object can be obtained by determining the disparity of the foreground object in the two captured images.

One method of determining depth of a pixel or object using images captured by an array camera involves selecting an initial hypothesized depth or distance for a selected pixel from an image captured from a reference viewpoint/camera, and searching pixel locations in other images along the epipolar line between the reference viewpoint/camera and the camera capturing each of the other images for similar/matching pixels. This process is discussed in the patent incorporated by reference above, and can be modified to utilize two array cameras set farther apart than the cameras in a single array to determine depth to a higher precision as will be discussed further below.

Techniques such as those disclosed in the patent application incorporated above are typically used to generate a depth map from a reference viewpoint. The reference viewpoint can be from the viewpoint of one of the cameras in a camera array. Alternatively, the reference viewpoint can be an arbitrary virtual viewpoint. A depth map indicates the distance of the surfaces of scene objects from a reference viewpoint. Although a process for calculating depth using disparity is discussed above, any of a variety of techniques for calculating depth can be utilized in accordance with embodiments of the invention. Processes for depth measurement using stereo array cameras are discussed below.

Enhanced Distance Measurement Using Stereo Array Cameras

Figure 3A:
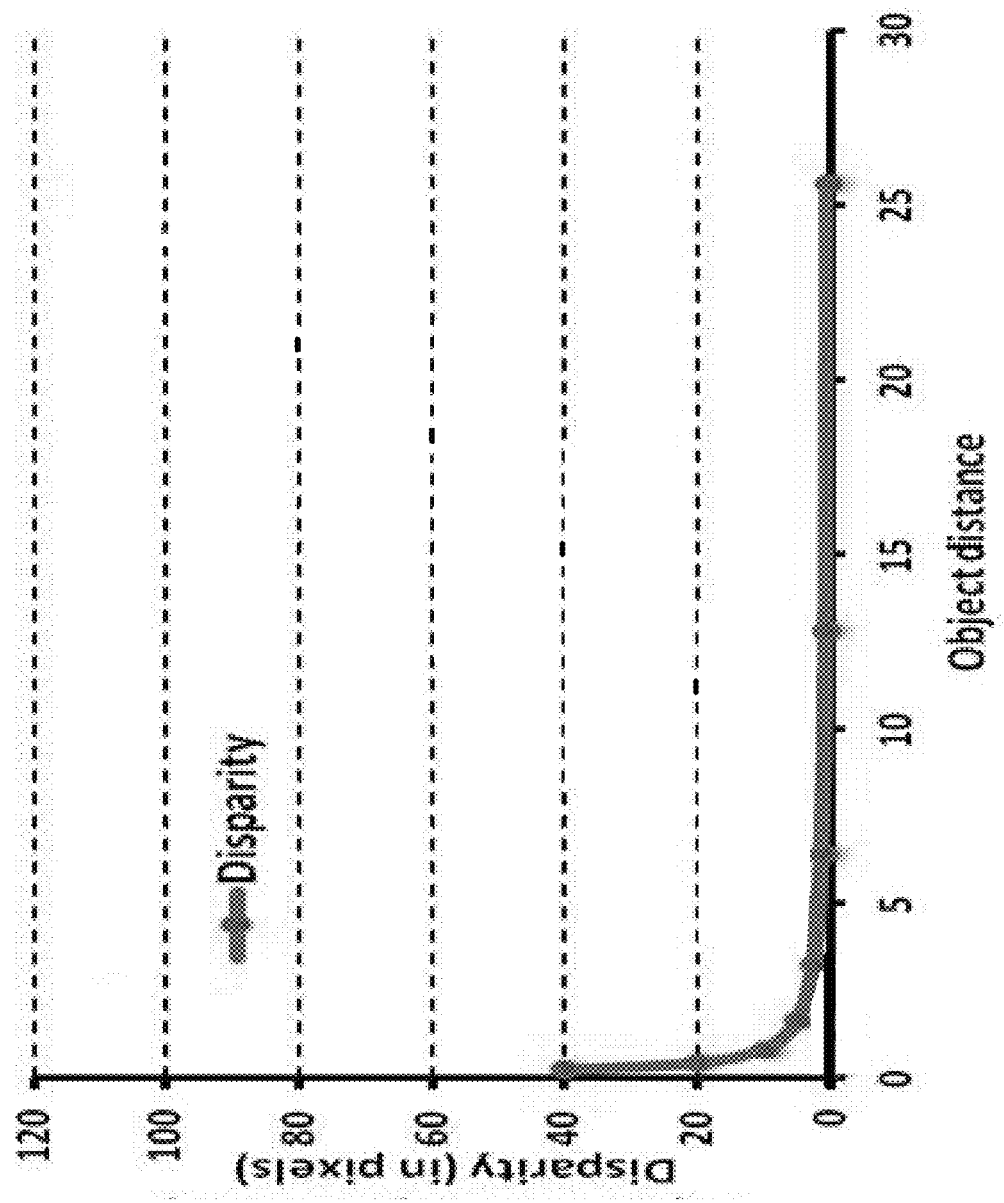
FIG. 3A is a graph illustrating object distance versus observed disparity.
Figure 3B:
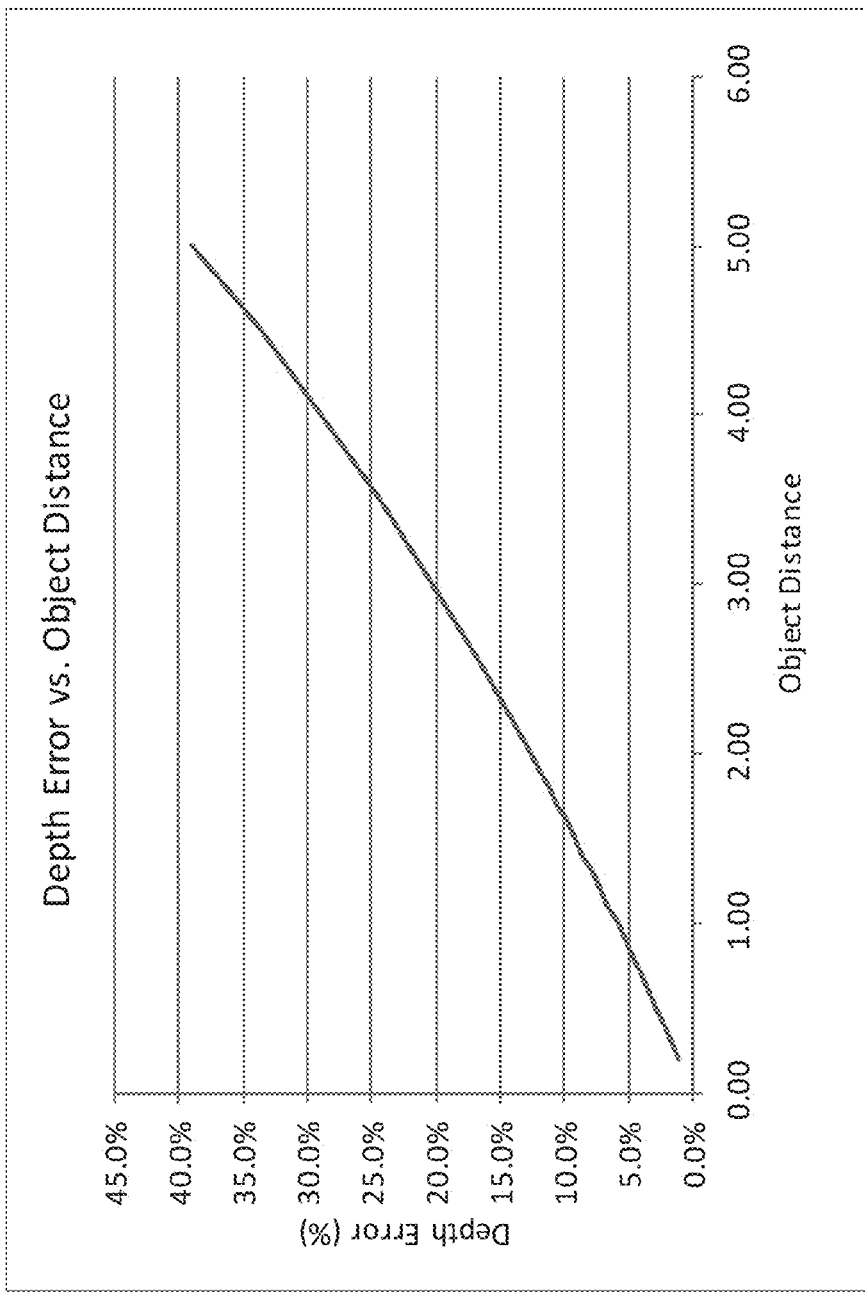
FIG. 3B is a graph illustrating object distance versus depth error.

The closer that an object is to an array camera, the larger the disparity that will be observed in the object's location in different images captured by different cameras in the array. A representative graph of object distance with observed disparity is illustrated in FIG. 3A. It can be seen in the graph that as the object distance approaches zero (i.e., comes closer to the camera), the disparity increases dramatically. Conversely, as the object distance increases, the disparity decreases. It can also be seen that the rate of change in disparity decreases as object distance increases. A representative graph of object distance with depth error is illustrated in FIG. 3B. The graph assumes a 4×4 array where the baseline between any two adjacent cameras is 2.3 mm, the pixel size is 1.75 µm, and the focal length is about 2 mm. The depth error is calculated as the percentage of depth resolution over object distance, where depth resolution indicates the resolution of the depth (the distance by which two objects should be separated for the array camera to distinguish between them as two separate depths) at a given object distance. It can be seen that depth error increases with object distance.

The further a camera is from the reference viewpoint the larger the disparity that will be observed. Typically larger shifts enable depth to be determined with greater precision. Increasing the baseline (distance between cameras) increases the observed disparity accordingly. Therefore, using a camera that captures an image from a reference viewpoint and the cameras that are furthest from that camera to determine depth information can improve precision.

Figure 4:
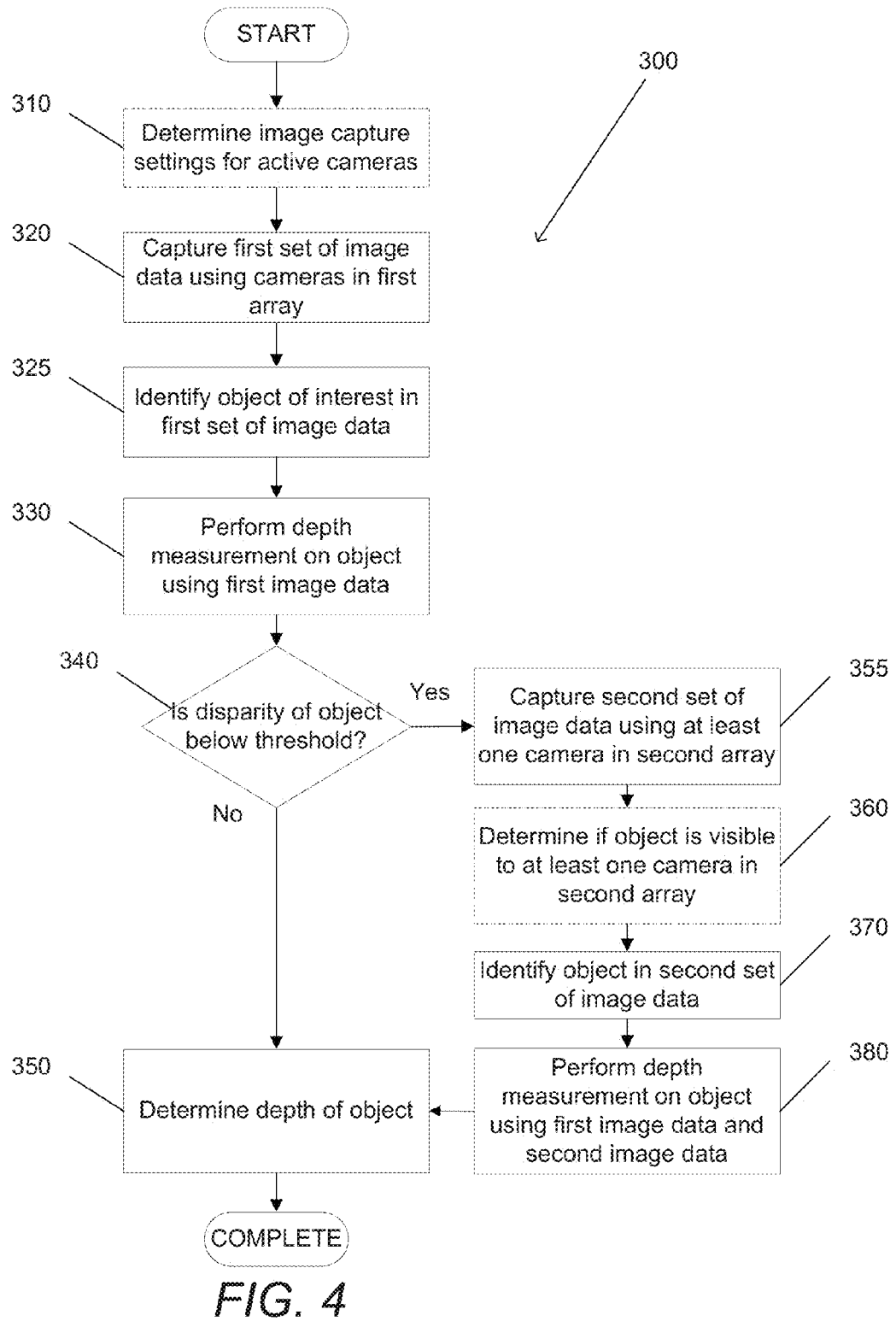
FIG. 4 illustrates a process for measuring depth using stereo array cameras in accordance with embodiments of the invention.

In many embodiments of the invention, two array cameras are set apart at a known distance in a stereo array camera configuration and image data from the two array cameras are used to generate depth information for an object observed by the cameras. In other embodiments, a stereo array camera includes an array camera and a legacy camera located a known distance from each other. A process for measuring depth using stereo array cameras in accordance with embodiments of the invention is illustrated in FIG. 4. The process includes determining (310) image capture settings for active cameras in a first array and a second array. Image capture settings can include calibration for nonlinearities or nonconformities in the lenses (e.g., by incorporating scene-independent geometric shifts as appropriate).

A first set of image data is captured (320) using active cameras in the first array. Typically, each camera collects image data that can be used to form an image from the point of view of the camera. In array cameras, often one camera is designated a reference camera and the image data captured by that camera is referred to as being captured from a reference viewpoint. In many embodiments of the invention, image data that is captured includes image data from a reference camera. In several embodiments, the active imagers capturing the image data are configured with color filters or other mechanisms to limit the spectral band of light captured. The spectral band can be (but is not limited to) red, blue, green, infrared, or extended color. Extended color is a band that includes at least a portion of at the band of wavelengths of least two colors. Systems and methods for capturing and utilizing extended color are disclosed in U.S. Patent Application No. 61/798,602 and Ser. No. 14/145,734 incorporated by reference above.

An object of interest is identified (325) in the first set of image data. The identification can be based upon a variety of techniques that include, but are not limited to: user input (e.g., selection on a screen), motion activation, shape recognition, and region(s) of interest. The identification can be made in an image generated from the first set of image data from the cameras in the first array. For example, the object of interest can be indicated in a preview image generated from the first set of image data or in a reference image from a reference viewpoint that corresponds to a reference camera in the first array. The identification can include selection of a pixel or set of pixels within the image associated with the object.

Using the first set of image data, a depth is determined (330) for the object. Techniques for determining the depth of the object can include those disclosed in U.S. Patent Application Ser. No. 61/691,666 incorporated by reference and discussed further above. The effects of noise can be reduced by binning or averaging corresponding pixels across images captured by different cameras utilizing techniques such as, but not limited to, those disclosed in U.S. Patent Application Ser. No. 61/783,441, filed Mar. 14, 2013, entitled "Systems and Methods for Reducing Motion Blur in Images or Video in Ultra Low Light with Array Cameras" to Molina and P.C.T. patent application Ser. No. 14/025,100, filed Mar. 12, 2014, entitled "Systems and Methods for Reducing Motion Blur in Images or Video in Ultra Low Light with Array Cameras" to Molina, the disclosures of which are hereby incorporated in their entirety. In several embodiments of the invention, intermediate images can be formed with pixel values in locations in each image where the pixel values are binned or averaged from corresponding pixels in different images. The intermediate images, which have noise components "averaged out" can then be used in depth calculation.

If the disparity of the object is above a predetermined threshold (340), i.e. is within a predetermined distance from the first array, the depth calculated above (330) is accepted as the depth of the object (350). A confidence measure can be given that is based on factors such as lens calibration and/or pixel resolution (the width that a pixel represents based on distance from the camera). The confidence measure can also incorporate information from a confidence map that indicates the reliability of depth measurements for specific pixels as disclosed in U.S. Patent Application Ser. No. 61/691,666 incorporated by reference above.

If the disparity of the object is below the predetermined threshold (340), then the depth measurement of the object is refined using a second set of image data from camera(s) in a second array. In some embodiments, the second array is instead a legacy camera. As discussed further above, a longer baseline between cameras can provide increased precision, because of increased disparity, out to further distances in measuring depth.

A second set of image data is captured (355) using at least one camera in the second array (or legacy camera). The object of interest is identified (370) in the second set of image data based upon a variety of techniques that can include those discussed above with respect to identifying the object in the first set of image data or other tracking techniques known in the art. If the system does not assume that the object of interest is visible to the second array, it can first determine (360) if the object is visible to at least one camera in the second array. Visibility can be determined, for example, by searching for similar pixels as discussed with respect to FIG. 9 in U.S. Patent Application Ser. No. 61/691,666 incorporated by reference above.

A depth measurement is performed (380) on the object using at least a portion of the first set of image data and at least a portion of the second set of image data. The measurement can include determining the disparity between pixel(s) associated with the object of interest in images captured by one or more cameras in the first array and corresponding pixel(s) in images captured by one or more cameras in the second array. In some embodiments, the second array is instead a legacy camera that captures a single image. The single image can similar be used as a second set of image data to determine disparity so long as pixel correspondences can be found between pixels in the first set of image data and the second set of image data.

Although specific processes are described above for obtaining depth measurements using multiple array cameras, any of a variety of combinations of two or more array cameras can be utilized to obtain depth measurements based upon the disparity observed between image data captured by cameras within the two array cameras can be utilized as appropriate to specific applications in accordance with embodiments of the invention.

A stereo array camera configuration can be formed in an ad hoc manner using one array camera and changing the position of the array camera. In many embodiments of the invention, an ad hoc stereo array camera includes an array camera capturing an image of a scene in one position, moving the array camera to a second position, and capturing a second image with the array camera in the second position. The two images captured in this way can form an ad hoc stereo pair of images. By correlating the features from the two images with each other and internal sensors such as a gyroscope and/or accelerometer in combination with the matched features, the camera extrinsics (such as camera center of projection and camera viewing direction) can be determined.

Unified Parallax Computation

A stereo array camera provides additional optimization possibilities in computing parallax disparities as compared to a single array camera. Parallax calculations can be performed using processes such as those disclosed in U.S. Provisional Patent Application Ser. No. 61/691,666 incorporated by reference above. As discussed above with respect to certain embodiments of the invention, parallax calculations can be performed to compute depths using the cameras in a first array in the stereo array camera. In many embodiments, information calculated using the first array can be used to accelerate calculation of depths with the second array in the stereo array camera. For example, in many processes for calculating depth, images are sampled for similar pixels to determine disparity as discussed in U.S. Provisional Patent Application Ser. No. 61/691,666. When pixels and/or objects have a depth that was already calculated by a first array, the search for similar pixels in the second array can use the depth information for the same pixel/object as a starting point and/or to limit the search to the "expected" portions of the image as predicted by the existing depth information. In several embodiments, the pixel/object can be correspondingly identified in images captured by the second array such that the existing depths can be applied to the proper pixel/object, even when the corresponding pixel/object is not in the same location within the image(s). In many embodiments, correspondence of pixels/objects is not necessarily determined for part or all of an image, but the depths of each pixel in the first image are used for calculating the depth of the pixel in the same location in the second image.

Figure 5:
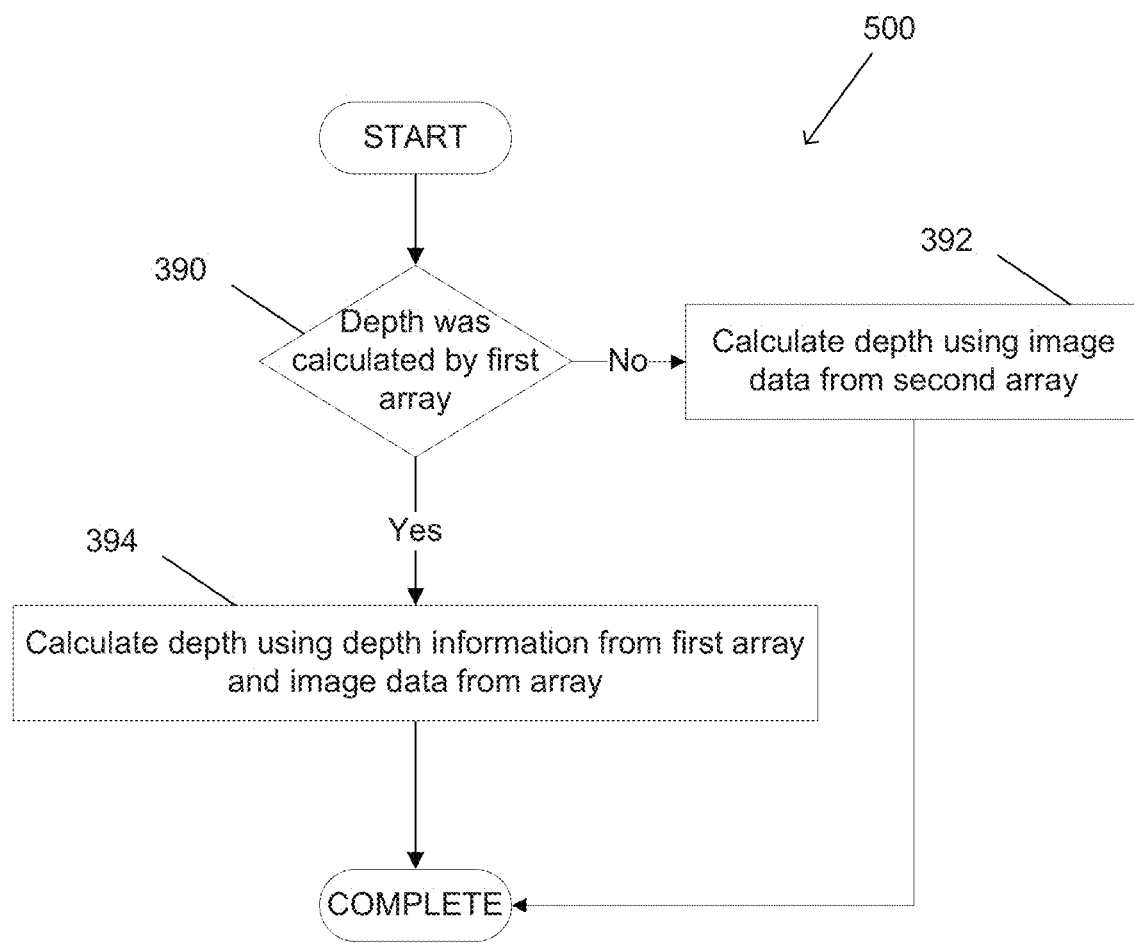
FIG. 5 illustrates a process for reusing depth information in accordance with embodiments of the invention.

A process for reusing depth information in accordance with embodiments of the invention is illustrated in FIG. 5. The process includes determining (390) if depth was calculated for a pixel by a first array. If depth was not calculated, a depth is calculated (392) for the pixel using image data from the second array. If depth was calculated for the pixel, a depth is calculated (394) using image data from the second array taking into consideration the depth information from the first array, such as by limiting and/or refining the search for similar pixels as discussed above.

High Resolution Image Synthesis

The image data in low resolution images captured by a array camera can be used to synthesize a high resolution image using super-resolution processes such as those described in U.S. patent application Ser. No. 12/967,807 entitled "Systems and Methods for Synthesizing High Resolution Images Using Super-Resolution Processes" to Lelescu et al. The disclosure of U.S. patent application Ser. No. 12/967,807 is hereby incorporated by reference in its entirety. A super-resolution (SR) process can be utilized to synthesize a higher resolution (HR) 2D image or a stereo pair of higher resolution 2D images from the lower resolution (LR) images captured by an array camera. The terms high or higher resolution (HR) and low or lower resolution (LR) are used here in a relative sense and not to indicate the specific resolutions of the images captured by the array camera.

A stereo array camera configuration can also be used to create a HR image by using the cameras from both arrays. While the relatively large baseline between the two stereo array cameras would result in relatively larger occlusion zones (where parallax effects block some content that is captured in one camera from being captured in another camera), in other visible areas the cameras from the two arrays would enhance the final achieved solution. Preferably, each array camera is complete in its spectral sampling and utilizes a π color filter pattern so that the image that is synthesized using the cameras in one array is devoid of parallax artifacts in occlusion zones. In several embodiments, color filters in individual cameras can be used to pattern the camera module with π filter groups as further discussed in U.S. Provisional Patent Application No. 61/641,165 entitled "Camera Modules Patterned with pi Filter Groups", to Nisenzon et al. filed May 1, 2012, the disclosure of which is incorporated by reference herein in its entirety.

High resolution (HR) images can be used to enhance depth measurement using stereo (two or more) array cameras in processes such as those described further above. In several embodiments of the invention, HR images are generated from image data captured by cameras in stereo array cameras. Each HR image can be generated using images captured by cameras in one array or images captured by cameras in both arrays. The HR images can then be used as image data in processes for generating depth measurement such as those described above. Measurement can be more robust using HR images because it is typically less sensitive to noise. Creating high resolution depth maps in accordance with embodiments of the invention is discussed below.

High Resolution Depth Map

The image data captured by a stereo array camera can be used to generate a high resolution depth map whose accuracy is determined by the baseline separation between the two arrays rather than the baselines of the individual cameras within either array. Depth maps can be generated by any of a variety of processes including those disclosed in U.S. Provisional Patent Application Ser. No. 61/691,666 incorporated by reference above. As discussed further above, the accuracy of depth measurement by an array camera is reduced at further distances from the camera. By using images captured by cameras in one array in a stereo array configuration with images captured by cameras in a second array, the baseline between the two cameras is significantly increased over the baseline between two cameras in a single array.

Auto Calibration of Stereo Array Cameras

A legacy stereo camera typically relies on a very accurate calibration between the two cameras to achieve the stereo effect. However, if the two cameras go out of alignment (e.g., by being dropped) the baseline between the two cameras becomes unknown. Without knowing the baseline, the ability to generate stereo imagery from the camera system is lost because the measured disparities cannot be converted into accurate estimates of depth.

With array cameras arranged in a stereo configuration in accordance with embodiments of the invention, each array individually can generate depth information for objects in a scene. By cross-correlating the pixels of the two array cameras or the depths calculated by the two array cameras, the baseline between the two array cameras can be estimated. This approach to estimating the baseline typically only works well when there are objects visible to both camera arrays whose depths can be calculated reasonably accurately using each camera array independently. If only objects at infinity are visible to both camera arrays, auto calibration as described here may not work. The depths calculated by a single array camera often will have some degree of error due to noise, nonlinearities or manufacturing defects in the lenses of the cameras, and/or other factors. The error can manifest in statistical variations in the depths calculated by the array camera. By correlating the depths calculated by one array in a stereo array camera with the depths calculated by the second array and/or depths calculated using images from one array together with images from the second array, an estimate can be made of the most likely baseline between the two array cameras in the stereo array.

Using the calculated baseline, the stereo array camera can calculate (or recalculate) depth to a higher precision for any object that is visible to both cameras in the array, such as by the processes outlined further above.

Near-Field and Far-Field Stereo

With a legacy stereo camera, an object is typically captured in stereo only if it is within the field of view of both (left and right) cameras. However, as the object comes closer to the stereo camera, it will eventually move out of the field of view of one of the cameras while still remaining in the field of view of the other camera. At this point, the stereo effect is lost because only one camera can "see" the object.

A stereo array camera in accordance with embodiments of the invention can generate both near-field and far-field stereo. As an object comes closer and moves out of the field of view of one array camera in a stereo configuration while staying within the field of view of the other array camera, it will still be captured in stereo. The cameras in the second array, which still "sees" the object, can be used to synthesize one or more virtual viewpoints (e.g., a left eye and right eye view). Good stereo acuity can be expected because the object will be close enough that the depth resolution will be high (i.e., precision of depth measurement). Processes for generating virtual viewpoints for stereo vision in accordance with embodiments of the invention are disclosed in U.S. Provisional Patent Application Ser. No. 61/780,906 entitled "Systems and Methods for Parallax Detection and Correction in Images Captured Using Array Cameras" to Venkataraman et al., filed Mar. 13, 2013, the disclosure of which is hereby incorporated by reference in its entirety.

Time elapsed between two images captured by a camera can be utilized with location information to provide a speed measurement. Speed measurement using array cameras in accordance with embodiments of the invention is discussed below.

Speed Measurement Using Array Cameras

Motion of an object across the field of view of a digital camera can generally be translated into an angular measurement (or angular velocity with elapsed time information) if the pixel size and back focal length are known, within the tolerance of one pixel and the corresponding angular measure of one pixel. At any given distance d from the camera, the angular measure of one pixel uniquely corresponds to a linear measure. Therefore, given a starting and ending location of an object in two dimensional images captured by a digital camera and the starting and ending distance of the object from the camera, the relative starting and ending locations of the object can be determined in three dimensional space. Provided the time elapsed between the images, the speed (or velocity) of the object can also be calculated. Given one start location and one end location, this can be represented as a linear velocity. Given multiple locations over time, the distance between each pair of consecutive locations (i.e. segment) can be determined and the distances of the segments combined to give a total distance. Additionally, a total average speed can be found by dividing the total distance over the time elapsed or by averaging the speed in each segment (distance divided by time elapsed in that segment) over the total time elapsed.

Conventional digital cameras typically capture two dimensional images without the capability of depth/distance measurement and are thus limited to angular measurement of motion. As discussed further above, array cameras can be used to determine depth by observing the disparity between multiple images that are captured by different cameras in the array. Formulas and techniques for determining distance relative to pixel disparity as in U.S. Patent Application Ser. No. 61/691,666 incorporated by reference above can also be used to determine the linear measure that the width of one pixel corresponds to at a given distance from the camera. In addition, one can calculate the time elapsed between the starting and ending frames simply by counting the number of frames between them and observing the frame rate of video capture of the camera.

Figure 6:
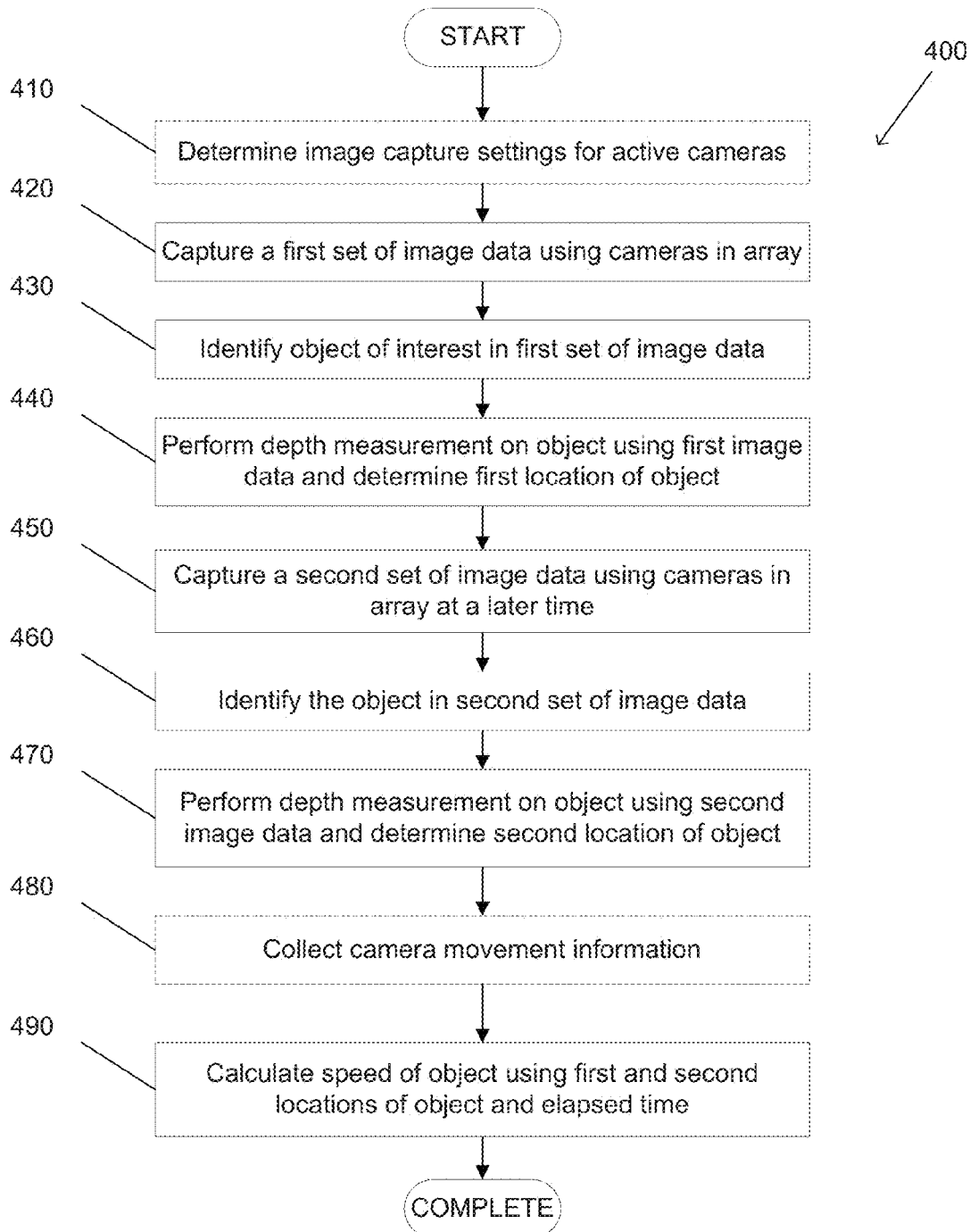
FIG. 6 illustrates a process for measuring speed using an array camera in accordance with embodiments of the invention.

In many embodiments of the invention, depth information for an object is combined with an angular measure of the object's position to provide a three-dimensional location for the object. In various embodiments of the invention, depth can be calculated using a single array camera or two array cameras in a stereo configuration as discussed further above. The three-dimension location of an object in two or more images can be used to calculate a speed and direction of the object. A process for measuring speed using an array camera in accordance with embodiments of the invention is illustrated in FIG. 6. The process includes determining (410) image capture settings for active cameras in an array camera. Image capture settings can include calibration for nonlinearities or nonconformities in the lenses (e.g., by incorporating scene-independent geometric shifts as appropriate). For example, due to physical characteristics of a lens stack, a pixel that is closer to the center line of a camera may differ in the area of a scene captured by the pixel from a pixel that is farther from the center line.

A first set of image data is captured (420) using active cameras in the array camera. Typically, each camera collects image data that can be used to form an image from the point of view of the camera. In array cameras, often one camera is designated a reference camera and the image data captured by that camera is referred to as being captured from a reference viewpoint. In many embodiments of the invention, depth measurements are made with respect to the viewpoint of the reference camera using at least one other camera (alternate view cameras) within the array.

An object of interest is identified (430) in the first set of image data. The identification can be based upon a variety of techniques that include, but are not limited to: user input (e.g., selection on a screen), motion activation, shape recognition, and region(s) of interest. The identification can be made in an image generated from the first set of image data from the cameras in the first array. For example, the object of interest can be indicated in a preview image generated from the first set of image data or in a reference image from a reference viewpoint that corresponds to a reference camera in the first array. The identification can include selection of a pixel or set of pixels within the image associated with the object.

Using the first set of image data, a first depth measure and a first location are determined (440) for the object. Techniques for determining the depth of the object can include those disclosed in U.S. Patent Application Ser. No. 61/691, 666 incorporated by reference and discussed further above. Depth can be calculated using a single array camera or two array cameras in a stereo configuration as discussed further above. Using the two-dimensional location of the object in an image (e.g., a reference image) an angular measure can be determined for the location of the object with respect to the camera. Combining the angular measure with the depth measure gives a three-dimensional location of the object with respect to the camera. Any of a variety of coordinate systems can be utilized in accordance with embodiments of the invention to represent the calculated location of the object. In several embodiments of the invention, the centerline of a camera is treated as the origin.

At some time t after the capture of the first set of image data, a second set of image data is captured (450) using the cameras in the array. In many embodiments of the invention, the same set of cameras utilized to capture the first set of image data are used to capture the second set of image data. In other embodiments, a second set with a different combination of cameras is used to capture the second set of image data.

The object of interest is identified (460) in the second set of image data. Identification can be based upon a variety of techniques that can include those discussed above with respect to identifying the object in the first set of image data or other tracking techniques known in the art.

Using the second set of image data, a second depth measure and a second location are determined for the object (470). Depth can be calculated using techniques discussed further above using a single array camera or two array cameras in a stereo configuration. Location can be calculated using techniques discussed further above and can incorporate known information about the location of the second camera in relation to the first camera (e.g., removing parallax effects).

In different scenarios, an array camera used to capture sets of image data for speed measurement may be stationary (e.g., tripod mounted) or may be in motion (e.g., handheld or panning across a scene). It can also include an array camera using multiple image captures from slightly different points of view to get the advantage of a larger baseline and a more accurate depth. In several embodiments of the invention, an array camera is assumed to be stationary and need not compensate for motion of the camera. In other embodiments of the invention, an array camera includes sensors that collect camera motion information (480) on up to six degrees of movement of the camera, including motion along and rotation about three perpendicular axes. These sensors can include, but are not limited to, inertial sensors and MEMS gyroscopes. Camera motion information that is collected can be used to incorporate motion compensation when calculating the speed and/or direction of an object of interest (i.e., using the camera as a frame of reference). Motion compensation may be appropriate for functions such as stabilization (when there is jitter from slight movements of the camera such as by hand movement) or tracking an object (panning the camera to keep a moving object within the camera's field of view). In further embodiments of the invention, an array camera is configurable to switch between an assumption that it is stationary (no motion compensation) and that it is moving or moveable (apply motion compensation).

The speed of the object of interest is calculated (490) using the first location and second location of the object. The direction can also be calculated from the location information, as well as a vector representing the speed and direction of the object.

A confidence measure can be given that is based on factors such as lens calibration and/or pixel resolution (the width that a pixel represents based on distance from the camera). The confidence measure can also incorporate information from a confidence map that indicates the reliability of depth measurements for specific pixels as disclosed in U.S. Patent Application Ser. No. 61/691,666 incorporated by reference above.

Additionally, calculating speed in accordance with embodiments of the invention can involve calculating a refined depth measurement using two or more array cameras as discussed further above with respect to FIG. 4 or two separate image captures with the same array camera. The technique of using two different image captures of the same scene with the same array camera can also be extended to legacy cameras, wherein the legacy camera captures two images from different points of view, and depth and other measurements can be obtained through cross correlation of the images. In further embodiments of the invention, super-resolution processes can be utilized to perform measurements of angular position relative to the reference viewpoint at a higher precision. The super-resolution processes synthesize higher resolution images and the pixels in the synthesized higher resolution image enable measurement of the location of an object relative to an origin point within the image with higher precision. Accordingly, synthesizing a time sequence of higher resolution images using super-resolution processes can facilitate higher precision velocity measurements than measurements obtained using the lower resolution image data captured by the reference camera. Although a specific process for calculating speed is discussed above with respect to FIG. 6, any of a variety of processes for calculating speed can be utilized in accordance with embodiments of the invention.

Although the present invention has been described in certain specific aspects, many additional modifications and variations would be apparent to those skilled in the art. It is therefore to be understood that the present invention may be practiced otherwise than specifically described, including various changes in the implementation, without departing from the scope and spirit of the present invention. Thus, embodiments of the present invention should be considered in all respects as illustrative and not restrictive.

What is claimed is:

1. A method of generating depth information for an object in a scene using two or more array cameras that each include a plurality of imagers where each imager captures an image of the scene, the method comprising:
    obtaining a first set of image data comprising image data of a scene captured from a first set of different viewpoints;
    identifying an object of interest in the first set of image data;
    determining a first depth measurement for the object of interest using at least a portion of the first set of image data;
    determining whether the first depth measurement for the object of interest is above a predetermined threshold; and
    when the depth for the object of interest is above the predetermined threshold:
        obtaining a second set of image data comprising image data of the same scene from a second set of different viewpoints located known distances from at least one viewpoint in the first set of different viewpoints;
        identifying the object of interest in the second set of image data; and
        determining a second depth measurement for the object of interest using at least a portion of the first set of image data and at least a portion of the second set of image data.

2. The method of claim 1, wherein obtaining a first set of image data comprising image data of a scene captured from a first set of different viewpoints comprises capturing a first set of image data using a first plurality of imagers in a first array.

3. The method of claim 2, further comprising determining image capture settings for active imagers in the first array.

4. The method of claim 3, wherein determining image capture settings for active imagers in the first array comprises calibrating for nonlinearities in the lenses of a plurality of the first plurality of imagers.

5. The method of claim 2, wherein one of the imagers is designated as a reference camera and captures image data from a reference viewpoint.

6. The method of claim 2, wherein identifying an object of interest in the first set of image data comprises generating a preview image, presenting the preview image via a screen, and capturing user input.

7. The method of claim 2, wherein identifying an object of interest in the first set of image data comprises detecting motion in an area of the scene.

8. The method of claim 2, wherein identifying an object of interest in the first set of image data comprises detecting an object in a designated region of interest.

9. The method of claim 2, wherein identifying an object of interest in the first set of image data comprises selecting one or more pixels and associating the one or more pixels with the object.

10. The method of claim 2, wherein obtaining a second set of image data comprising image data of the same scene from a second set of different viewpoints located known distances from at least one viewpoint in the first set of different viewpoints comprises capturing a second set of image data using a second plurality of imagers in a second array.

11. The method of claim 10, wherein the second array is the first array placed in a different location from the location in which the first array captured the first set of image data.

12. The method of claim 11, further comprising estimating the baseline distance between the two arrays by cross-correlating one or more sets of corresponding pixels from the first set of image data and the second set of image data.

13. The method of claim 1, wherein determining a first depth measurement for the object of interest using at least a portion of the first set of image data comprises determining the disparity between the location of a pixel in one image in the first set of image data and a corresponding pixel in a second image in the first set of image data.

14. The method of claim 1, further comprising calculating a confidence measure for the depth of the object of interest.

15. The method of claim 1, further comprising determining if the object of interest is visible in the second set of image data and identifying the object of interest in the second set of image data when the object of interest is visible in the second set of image data.

16. The method of claim 1, wherein determining a second depth measurement for the object of interest using at least a portion of the first set of image data and at least a portion of the second set of image data comprises determining the disparity between a first pixel associated with the object of interest in at least one image in the first set of image data and a corresponding second pixel in at least one image in the second set of image data.

17. The method of claim 1, wherein determining a second depth measurement for the object of interest using at least a portion of the first set of image data and at least a portion of the second set of image data comprises calculating the disparity between the location of a pixel in one image in the first set of image data and a corresponding pixel in a second image in the second set of image data.

18. The method of claim 1, wherein determining a second depth measurement for the object of interest using at least a portion of the first set of image data and at least a portion of the second set of image data comprises utilizing the first depth measurement for the object of interest.

* * * * *